United States Patent
Ohtsuka et al.

(10) Patent No.: US 6,543,872 B2
(45) Date of Patent: Apr. 8, 2003

(54) INK-JET PRINTING METHOD AND APPARATUS FOR PRINTING WITH INKS OF DIFFERENT DENSITIES

(75) Inventors: Naoji Ohtsuka, Yokohama (JP); Kentaro Yano, Yokohama (JP); Kiichiro Takahashi, Kawasaki (JP); Hitoshi Nishikori, Inagi (JP); Osamu Iwasaki, Tokyo (JP); Daigoro Kanematsu, Yokohama (JP); Hidehiko Kanda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/865,450

(22) Filed: May 29, 2001

(65) Prior Publication Data

US 2002/0012018 A1 Jan. 31, 2002

Related U.S. Application Data

(62) Division of application No. 08/847,740, filed on Apr. 22, 1997.

(30) Foreign Application Priority Data

Apr. 23, 1996 (JP) .............................................. 8-101711
Apr. 23, 1996 (JP) .............................................. 8-101712

(51) Int. Cl.⁷ ........................ B41J 29/393; B41J 29/38; B41J 2/175
(52) U.S. Cl. .............................. 347/19; 347/14; 347/87
(58) Field of Search ................................ 347/9, 87, 14, 347/19, 15, 43, 23, 12, 10, 11, 86, 85

(56) References Cited

U.S. PATENT DOCUMENTS

| | | | |
|---|---|---|---|
| 4,313,124 A | 1/1982 | Hara | 347/57 |
| 4,345,262 A | 8/1982 | Shiratao et al. | 347/10 |

(List continued on next page.)

FOREIGN PATENT DOCUMENTS

| | | | |
|---|---|---|---|
| EP | 0 351 754 | 1/1990 | 347/19 |
| EP | 0 372 826 | 6/1990 | 347/15 |
| EP | 0 401 023 | 12/1990 | 347/15 |
| EP | 0 440 261 | 8/1991 | 347/7 |
| EP | 0 574 199 | 12/1993 | |

(List continued on next page.)

*Primary Examiner*—John Barlow
*Assistant Examiner*—Charles W. Stewart, Jr.
(74) *Attorney, Agent, or Firm*—Fitzpatrick, Cella, Harper & Scinto

(57) ABSTRACT

It is checked whether an ink used in a printhead has a high density. The type of a printing medium used for a print operation is also identified. An image is printed by scanning the printhead once or a plurality of times. When a print operation is to be performed by using a thick ink, an image is printed by using mask data and the driving frequency of the head which are set for the thick ink. When a print operation is to be performed by using a thin ink, an image is printed by using mask data and the driving frequency of the head which are set for the thin ink and the type of printing medium used for the print operation. Codes of the respective color data of print data are determined in accordance with the types of inks used for a print operation, and an image is printed by printing a plurality of dots or dots in an overlapping state by the multi-pass method.

22 Claims, 30 Drawing Sheets

U.S. PATENT DOCUMENTS

| | | | |
|---|---|---|---|
| 4,459,600 A | | 7/1984 | Sato et al. ............... 347/47 |
| 4,463,359 A | | 7/1984 | Ayata et al. ............. 347/56 |
| 4,516,135 A | | 5/1985 | Todoh .................... 347/184 |
| 4,528,576 A | | 7/1985 | Koumura et al. ......... 347/15 |
| 4,558,333 A | | 12/1985 | Sugitani et al. .......... 347/65 |
| 4,560,997 A | | 12/1985 | Sato et al. ............... 347/15 |
| 4,608,577 A | | 8/1986 | Hori ....................... 347/66 |
| 4,617,580 A | * | 10/1986 | Miyakawa ............... 347/14 |
| 4,630,076 A | | 12/1986 | Yoshimura .............. 347/19 |
| 4,635,078 A | | 1/1987 | Sakurada et al. ........ 347/15 |
| 4,723,129 A | | 2/1988 | Endo et al. .............. 347/56 |
| 4,740,796 A | | 4/1988 | Endo et al. .............. 347/56 |
| 4,860,026 A | | 8/1989 | Matsumoto et al. ...... 347/15 |
| 4,872,027 A | * | 10/1989 | Buskirk et al. .......... 347/19 |
| 5,049,898 A | | 9/1991 | Arthur et al. ............. 347/19 |
| 5,097,343 A | | 3/1992 | Chiba et al. ............. 358/246 |
| 5,138,344 A | | 8/1992 | Ujita ....................... 347/86 |
| 5,142,374 A | | 8/1992 | Tajika et al. ............. 358/298 |
| 5,235,351 A | | 8/1993 | Koizumi .................. 347/14 |
| 5,245,362 A | | 9/1993 | Iwata et al. .............. 347/23 |
| 5,394,250 A | | 2/1995 | Shono ..................... 358/455 |
| 5,448,274 A | | 9/1995 | Hirabayashi et al. ..... 347/86 |
| 5,579,446 A | | 11/1996 | Naik et al. ............... 358/1.9 |
| 5,604,520 A | | 2/1997 | Matsubara et al. ....... 347/43 |
| 5,623,294 A | | 4/1997 | Takizawa et al. ......... 347/98 |
| 5,625,384 A | | 4/1997 | Numata et al. ........... 347/23 |
| 5,625,397 A | | 4/1997 | Allred et al. ............. 347/100 |
| 5,714,990 A | | 2/1998 | Courtney ................. 347/14 |
| 5,729,259 A | | 3/1998 | Gotoh et al. ............. 347/43 |
| 5,739,828 A | * | 4/1998 | Moriyama et al. ....... 347/9 |
| 5,742,306 A | | 4/1998 | Gompertz et al. ........ 347/43 |
| 5,805,180 A | | 9/1998 | Ebisawa et al. .......... 347/23 |
| 5,818,474 A | | 10/1998 | Takahashi et al. ........ 347/15 |
| 5,828,389 A | | 10/1998 | Yamaguchi et al. ...... 347/23 |
| 5,831,646 A | | 11/1998 | Kuronuma et al. ....... 347/30 |
| 5,854,642 A | | 12/1998 | Takahashi et al. ........ 347/40 |
| 5,946,419 A | | 8/1999 | Chen et al. ............... 382/243 |
| 6,027,196 A | | 2/2000 | Gotoh et al. ............. 347/7 |
| 6,120,129 A | | 9/2000 | Iwasaki et al. ........... 349/19 |
| 6,142,600 A | | 11/2000 | Takahashi et al. ........ 347/19 |
| 6,145,950 A | | 11/2000 | Ohtsuka et al. .......... 347/15 |
| 6,158,836 A | | 12/2000 | Iwasaki et al. ........... 347/15 |

FOREIGN PATENT DOCUMENTS

| | | | |
|---|---|---|---|
| EP | 0 585 028 | 3/1994 | ............ 347/19 |
| EP | 0 595 517 | 5/1994 | ............ 347/43 |
| EP | 0 600 735 | 6/1994 | ............ 347/7 |
| EP | 0 627 323 | 12/1994 | ............ 347/40 |
| EP | 0 628 415 | 12/1994 | ............ 347/19 |
| EP | 0 630 752 | 12/1994 | ............ 347/19 |
| EP | 0 642 260 | 3/1995 | ............ 347/15 |
| EP | 0 654 352 | 5/1995 | ............ 347/7 |
| EP | 0 687 565 | 12/1995 | ............ 347/15 |
| EP | 0 688 673 | 12/1995 | ............ 347/15 |
| EP | 0 700 786 | 3/1996 | ............ 347/7 |
| EP | 0 720 916 | 7/1996 | ............ 347/19 |
| EP | 0 741 488 | 11/1996 | ............ 347/19 |
| EP | 0 750 994 | 1/1997 | ............ 347/19 |
| JP | 54-56847 | 5/1979 | ............ 347/19 |
| JP | 59-123670 | 7/1984 | ............ 347/43 |
| JP | 59-138461 | 8/1984 | ............ 347/15 |
| JP | 60-71260 | 4/1985 | ............ 347/43 |
| JP | 60-163571 | 8/1985 | ............ 347/43 |
| JP | 62-161541 | 7/1987 | ............ 347/19 |
| JP | 2-31562 | 2/1990 | ............ 347/43 |
| JP | 03-5156 | 1/1991 | ............ 347/40 |
| JP | 03-51138 | 3/1991 | ............ 347/7 |
| JP | 4-332652 | 11/1992 | |
| JP | 06-155758 | 6/1994 | ............ 347/7 |
| JP | 06-199031 | 7/1994 | ............ 347/19 |
| JP | 6-328733 | 11/1994 | |
| JP | 7-52390 | 2/1995 | ............ 347/40 |
| JP | 7-60969 | 3/1995 | |
| JP | 7-144419 | 6/1995 | ............ 347/15 |
| JP | 8-58082 | 3/1996 | |

* cited by examiner

FIG. 9

| ID | PIGMENT DENSITY | DATA | MAXIMUM INJECTION AMOUNT | CORRESPONDING MEDIUM |
|---|---|---|---|---|
| 1 | Y 2.5%<br>M 3.0%<br>C 2.7%<br>K 2.6% | BINARY DATA AT 360 × 360dpi | C 100%<br>M 100%<br>Y 100%<br>K 100%<br><br>R 200%<br>G 200%<br>B 200% | PLAIN PAPER<br>COATED PAPER<br>PICTORIAL PAPER |
| 2 | Y 2.5%<br>M 1.0%<br>C 0.9%<br>K 1.3% | QUATERNARY DATA AT 360 × 360dpi | C 300%<br>M 300%<br>Y 100%<br>K 200%<br><br>R 400%<br>G 400%<br>B 400% | COATED PAPER<br>PICTORIAL PAPER |
| 3 | Y 2.5%<br>M 0.8%<br>C 0.7%<br>K 0.9% | QUINARY DATA AT 360 × 360dpi | C 400%<br>M 400%<br>Y 100%<br>K 300%<br><br>R 500%<br>G 500%<br>B 500% | PICTORIAL PAPER |

BINARY DATA AT
360 × 360dpi

◎ TWO DOTS PRINTED ON ONE PIXEL
   IN OVERLAPPING STATE
○ ONE DOT PRINTED ON ONE PIXEL
× NO DOT

QUATERNARY DATA
AT 360 × 360dpi

◎ TWO DOTS PRINTED ON ONE PIXEL
   IN OVERLAPPING STATE
○ ONE DOT PRINTED ON ONE PIXEL
× NO DOT

QUINARY DATA AT
360 × 360dpi

◎ TWO DOTS PRINTED ON ONE PIXEL
   IN OVERLAPPING STATE
○ ONE DOT PRINTED ON ONE PIXEL
× NO DOT

FIG. 19

```
PRINT MODE
        ○  NORMAL MODE
        ○  PICTORIAL MODE 1
        ○  PICTORIAL MODE 2
        ○  MONOCHROME MODE
```

FIG. 20

SET PLAIN PAPER, COATED PAPER, OR PICTORIAL PAPER

FIG. 21

MOUNT HEAD CARTRIDGE FOR PICTORIAL MODE 1

CURRENT HEAD CARTRIDGE | FOR NORMAL MODE

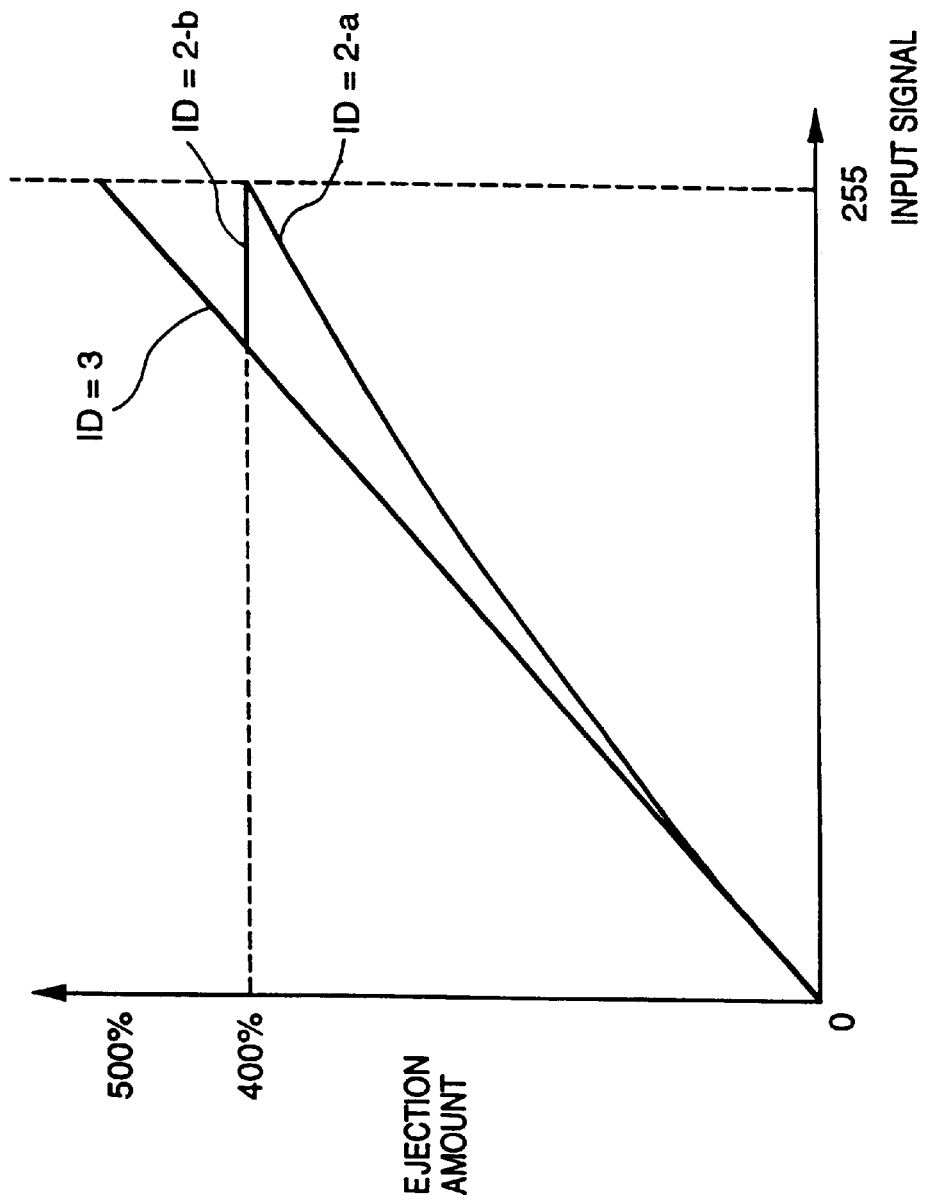

INK-JET PRINTING METHOD AND APPARATUS FOR PRINTING WITH INKS OF DIFFERENT DENSITIES

This application is a divisonal application of application Ser. No. 08/847,740, filed Apr. 22, 1997, allowed.

CROSS-REFERENCE TO RELATED APPLICATIONS

This application is related to U.S. patent application Ser. Nos. 08/847,743, now U.S. Pat. No. 6,120,129, 08/844,854, now U.S. Pat. No. 6,142,600, 08/847,744, now U.S. Pat. No. 6,145,950 and 08/847,984, now U.S. Pat. No. 6,158,836, each filed on the same day of the parent application. This application is also related to U.S. application Ser. Nos. 09/307,765, and 09/307,766, both filed May 10, 1999. All the applications are assigned to the assignee of this application and are incorporated herein by reference.

BACKGROUND OF THE INVENTION

The present invention relate to an ink-jet printing method and apparatus for printing an image on a printing medium by discharging an ink from a printhead onto the medium, and a printing system including the printing apparatus.

A printer apparatus such as a printer, a copying machine, or a facsimile machine is designed to print an image consisting of dot patterns on a printing medium such as a paper sheet or a thin plastic film on the basis of image information. The print schemes for such printer apparatuses can be classified into an ink-jet scheme, a wire dot scheme, a thermal scheme, a laser beam scheme, and the like. Of these schemes, the ink-jet scheme (ink-jet printer apparatus) is designed to discharge/spray an ink (printing material) from the orifices of the printhead and cause the ink to adhere to a printing medium, thereby printing an image.

With the widespread use of printer apparatuses, demands have recently arisen for printer apparatus which can realize high-speed print operations, high resolution, high image quality, low noise, and the like. As a printer apparatus which can meet such demands, an ink-jet printer apparatus is available. The ink-jet printer apparatus is designed to print an image by discharging an ink from the printhead, and hence can perform a non-contact print operation. This printer apparatus can therefore obtain a very stable image.

With the recent developments in various types of digital cameras, digital videos, CD-ROMs, and the like, pictorial image data can be easily processed on applications in host computers. Consequently, printer apparatuses as output devices are required to have a function of outputting pictorial images. Conventionally, such pictorial image output operations are performed by high-end silver salt type printer apparatuses designed to print images upon reception of digital image data and expensive sublimation type printer apparatuses whose application is limited to photographic outputs using sublimable dyes.

In the above prior art, a printer apparatuses exclusively used for prints of photographic images and the like is very expensive. This is because such a printer apparatus uses the silver salt scheme which requires a complicated process, and is too large to be used as a desktop type apparatus. Consider a printer apparatus designed to use sublimable dyes. As is known, in this case as well, as the size of a printing medium increases, the manufacturing cost of the main body and the running cost considerably increase. That is, such printer apparatuses cannot be easily used in homes. The most critical drawback of these printer apparatuses is that they are designed to use special printing media. That is, the applications of the printer apparatus are limited. For this reason, it is totally impossible for one printer apparatus to allow the user to selectively perform print operations using various types of printing media as in home and business use, e.g., printing images based on data from a wordprocessor or graphic data using plain paper in the normal mode and printing photographic images and the like using special printing media in the pictorial print mode.

According to improved printer apparatuses, especially ink-jet printer apparatuses, in order to solve these problems, image processing, coloring materials, printing media, and the like have been improved. Recently, therefore, great improvements have been made in the image quality of photographic images printed by ink-jet printer apparatuses.

In addition, as is known, a printer apparatus is becoming popular, which serves both as a monochrome printer apparatus and a color printer apparatus upon replacement of an ink cartridge integrally constituted by a printhead and an ink tank. Such a printer apparatus has been developed to enhance the monochrome print function of printing out images based on data from a wordprocessor at a high speed, and realize a function of printing color graphic images by using the limited resources of one printer apparatus. Most users are demanding this technique. This printer apparatus has a function of recognizing the type of ink cartridge and optimizing a print operation by, e.g., switching control for a monochrome cartridge and control for a color cartridge. At present, replacement of an ink cartridge is performed to only exchange a color ink and a monochrome ink.

Various studies have been made to improve the gradation characteristics of color graphic outputs in color print operations. For example, the resolution for such a print operation is set to be higher than that in the color print mode to improve the printing performance. The resolution of a printer apparatus is increased, and multivalued data is sent as print data to the printer apparatus. The printer apparatus then performs a multivalued output operation using sub-pixels. Such improvements have been proposed and put into practice.

In addition, a method of printing an image on a printing medium by using coloring materials having different pigment densities at once has been proposed to allow an ink-jet printer apparatus to print out a pictorial image. A printer apparatus designed to print an image by preparing two types of coloring materials having different pigment densities for each of coloring materials of C, M, Y, and K or C, M, and Y, and using them at once, unlike a general printer apparatus which uses four or three coloring materials of C, M, Y, and K or C, M, and Y, has been proposed. According to this printing scheme, the color reproduction range can be greatly broadened, and the graininess of an image can be made greatly reduced by printing a high-lightness area (in which printed dots are discretely present on a printing medium) of the image by using a coloring material having a low pigment density. In contrast to this, a low-lightness, high-saturation area is printed by using a coloring material having a high pigment density, which reduces the graininess of the resultant image, thereby obtaining an image with good color development.

In the above method, however, many types of coloring materials must be contained in one printer apparatus. The printer apparatus therefore becomes a very complicated system. In general, users print monochrome images in most cases. For this reason, it is often useless to always have coloring materials having low pigment densities in the printer apparatus at the same time. Furthermore, since the size of the printhead is limited, the maximum capacity for a print operation or the capacity of an ink tank for each coloring material must be reduced, thus posing problems.

The pigment density of a coloring material such as an ink is determined by the maximum necessary density in the system to be designed. The pigment density is determined to obtain a necessary optical reflection density from the maximum ejection amount in the system. In general, if the maximum saturation of a primary color (CMYK) is obtained by an ink ejection amount of 100%, almost the maximum saturation of a secondary color (RGB), which is the sum of primary colors at 100%, can also be obtained. In order to broaden the color reproduction range, therefore, the pigment density of a coloring material must be increased to further increase the density of the coloring material so as to obtain the maximum saturation of a primary color with an ink ejection amount of 100%. For this reason, the graininess of a pictorial image becomes conspicuous. That is, this method is not suited for business use of graphic images.

According to another method, the maximum ejection amounts of primary and secondary color inks can be set to 200% and 400%, respectively, by decreasing the pigment densities. In a general ink-jet printer apparatus, however, since the maximum amount of coloring material which can be received is determined by the type of printing medium, the types of printing media which can be used are limited. For this reason, the versatility of the ink-jet printer apparatus deteriorates, and the running cost is high.

As described above, when a print operation is to be performed by using a thin ink, a relatively large amount of ink must be ejected onto a printing medium. In practice, the graininess of dots of thick ink, e.g., black, cyan, or blue inks, can be effectively and greatly reduced by setting the density of such an ink to about ⅓ or less that of a conventional ink. According to a simple calculation, in this case, in order to obtain an image having almost the same color density as that of an image printed by using a conventional thick ink, the thin ink must be ejected onto a printing medium in an amount about three times that of the conventional ink.

In general, if the amount of ink ejected onto a printing medium per unit time exceeds the ink receiving capacity of the printing medium, or the amount (ink ejecting rate) of ink ejected onto a printing medium per unit time exceeds the ink absorbing rate of the printing medium, the ejected ink overflows on the printing medium, resulting in a blurred image. Alternatively, the ink moves on the printing medium because of the surface tension. As a result, the printed image has high- and low-density portions, and hence the image quality deteriorates.

When a print operation is to be performed by using a thin ink, in particular, a large amount of ink must be ejected onto a printing medium to increase the density of an image. The above problem therefore tends to arise.

In order to meet the needs of the users, the print speed of the printer apparatus must be increased beyond a predetermined speed. For this purpose, the moving speed of the carriage or the driving speed of the head must be increased. Accordingly, the ink ejecting rate increases. As a result, problems such as an ink overflow arise more easily.

SUMMARY OF THE INVENTION

The present invention has been made in consideration of the above conventional techniques, and has as its object to provide an ink-jet printing system which allows one printer apparatus to exchange and use cartridges or ink tanks containing inks having different color properties, and can print a high-quality image by exchanging these cartridges or ink tanks, and an ink-jet printing method and apparatus.

It is another object of the present invention to provide an ink-jet printing system which can print a high-quality photographic image with the gradation level being increased and the graininess being greatly reduced by printing it using inks having different color properties, and an ink-jet printing method and apparatus.

It is still another object of the present invention to provide an ink-jet printing system which can print an image upon changing the amounts of coloring materials ejected in accordance with the saturation and density of each ink used for a print operation such that the densities of pigments ejected onto a printing medium become almost the same, and setting optimal ink ejection amounts in accordance with the type of printing medium, and an ink-jet printing method and apparatus.

It is still another object of the present invention to provide an ink-jet printing system in which when a print operation is performed by using a thin ink, an image having almost the same density as that of an image obtained by using a thick ink can be efficiently obtained, and an ink-jet printing method and apparatus.

It is still another object of the present invention to provide an ink-jet printing system which can print a high-quality image while suppressing a decrease in print speed and preventing an ink from overflowing, and an ink-jet printing method and apparatus.

It is still another object of the present invention to provide an ink-jet printing system which can obtain a high-quality image by changing at least the print data, the print cycle, or the number of times of scanning in accordance with at least the saturation of an ink used for a print operation, the density of the ink, or the type of printing medium, and an ink-jet printing method and apparatus.

It is still another object of the present invention to provide an ink-jet printing system which performs a print operation using a thin ink by changing at least the number of times of scanning or the driving frequency of the head in accordance with the type of printing medium, thereby preventing the ink from overflowing the printing medium without decreasing the print speed, and an ink-jet printing method and apparatus.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the descriptions, serve to explain the principle of the invention.

FIG. 9 is a view for explaining the relationship between the pigment density of an ink, data, a printing medium, and the maximum ejection amount in the embodiment;

FIGS. 11A and 11B are views showing the layout of dots printed on a printing medium in the ink-jet printer apparatus of the embodiment, in which FIG. 11A shows the dots printed at 360 dpi, and FIG. 11B shows the positions of the dots printed on the basis of multivalued data;

FIGS. 12A to 12C are views showing print data and the layouts of print data in the embodiment, in which FIG. 12A shows a case of binary data, FIG. 12B shows a case of quaternary data, and FIG. 12C shows a case of quinary data;

FIGS. 19 to 21 are views showing samples displayed on the screen when a print mode is manually set in the second embodiment;

FIG. 25 is a graph showing the relationship between the identification code of a head cartridge and the ink ejection amount;

DETAILED DESCRIPTION OF THE PREFERRED EMBODIMENTS

Figure 1:
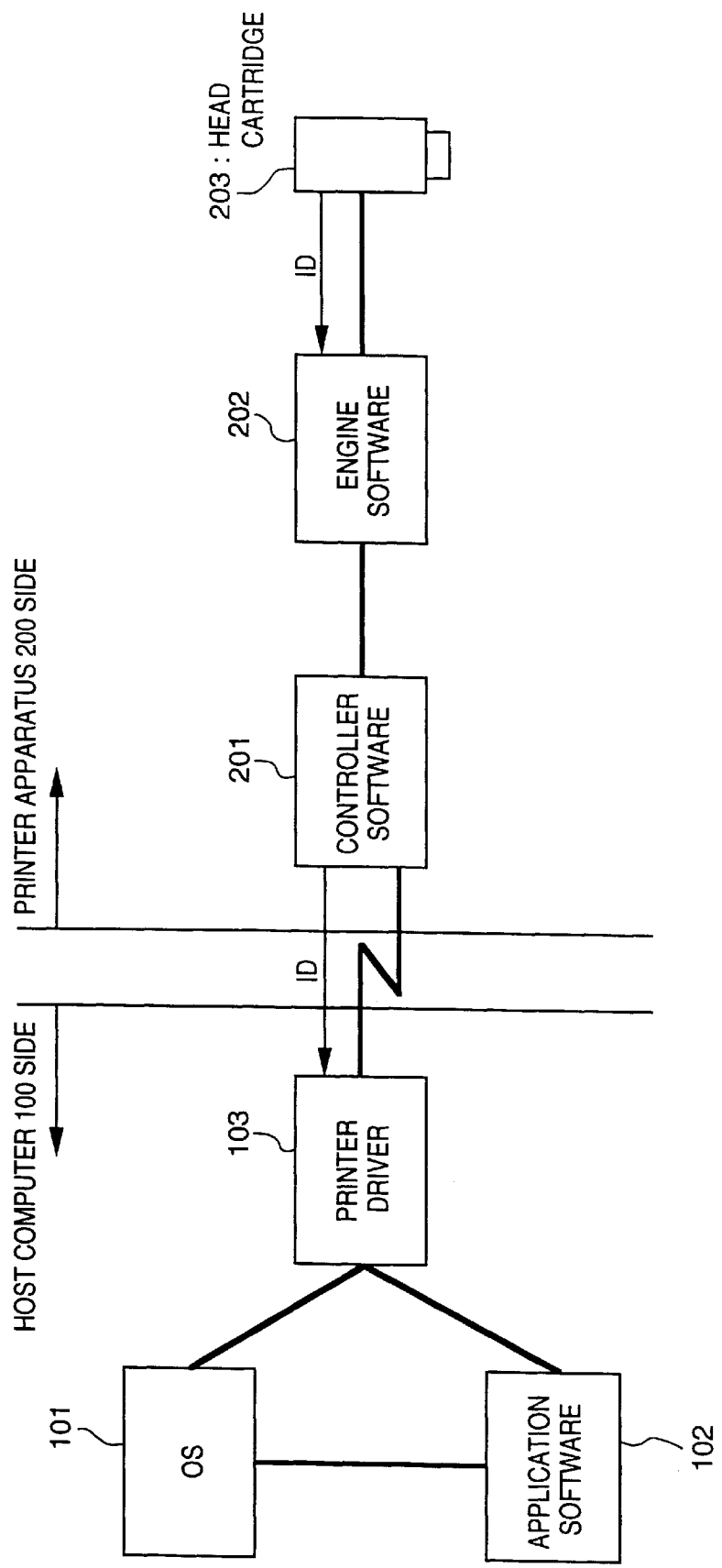
FIG. 1 is a block diagram showing the overall arrangement of a printing system including a host computer and a printer apparatus according to an embodiment of the present invention.

The characteristic features of an embodiment of the present invention will be described below prior to the description of the preferred embodiments.

(1) In the embodiment, a printer apparatus main body discriminates whether a printhead including a cartridge containing a relatively thick ink or a printhead including an ink cartridge containing at least a thin ink of one color is mounted. When a print operation is to be performed using a thin ink, the operation is performed by a divisional printing method (to be described later) of discharging the ink by the same number of times as in a print operation using a thick ink. In this case, when a print operation is to be performed using a thin ink, the amount of ink discharged per scanning operation is larger than that in a print operation using a thick ink. In addition, the driving frequency of the printhead is set, and the maximum amount of ink ejected per unit time is determined so as to prevent the ink from overflowing the printing medium (print paper or the like) selected by the user. This operation prevents the ink from overflowing the printing medium, and allows a print operation at the maximum speed while forming a high-quality image with little graininess.

(2) At least the amount of ink ejected or the maximum amount of ink ejected is changed in accordance with a combination of pigment densities upon identification of the ID data of an ink cartridge or setting of ID data. The embodiment includes a means of changing at least the amount of coloring material discharged onto a printing medium or the maximum amount of coloring material discharged.

(3) According to an improved form of the embodiment, when coloring materials having relatively low pigment densities are used, a color is separated into primary and secondary color components for each pixel, and the maximum amount of coloring material ejected is determined for each nth-order color component instead of simply increasing the maximum amount of coloring material ejected in accordance with the ratio between the pigment densities. A characteristic feature of this form is that, in this determination step, the amount of coloring material of each nth-order color component is independently regulated and increased to its maximum amount instead of being simply increased. With this operation, even if coloring materials having relatively low pigment densities are used, both images of primary and secondary color components have almost the same optical reflection densities as those obtained by using coloring materials having relatively high pigment densities. In addition, an increase in the amount of ink ejected can be suppressed, and hence an increase in running cost can be suppressed.

(4) In output data from a color processing module typified by a printer driver or the like, conversion of print data of each color into binary data or conversion into multivalued data can be selectively performed in accordance with the pigment density of a coloring material used for a print operation. In addition, the embodiment has a function of outputting multivalued data or high-resolution data when a mode requiring better gradation characteristics is set.

The preferred embodiments of the present invention will be described in detail below with reference to the accompanying drawings.

FIG. 1 is a block diagram for explaining the functional arrangement of a printing system including a host computer 100 and a printer apparatus (ink-jet printer) 200 according to the embodiment of the present invention.

Referring to FIG. 1, in the host computer 100, the exchange of various data and control are generally performed between an OS (Operating System) 101 and application software 102 which operates on the OS 101. Print data is exchanged between the OS 101, the application software 102, and a printer driver 103, and is sent to the printer apparatus 200 through the printer driver 103.

The flow of data in the process of printing out a color image from the printer apparatus 200 by using the application software 102 for handling pictorial images will be described below.

If the image data generated/edited by the application software 102 is pictorial image data, the data is sent as multivalued R, G, and B signals to the printer driver 103. The printer driver 103 performs color processing for the received multivalued R, G, and B signals, and also performs halftone processing for the signals to generally convert them into binary C (cyan), M (magenta), Y (yellow), and K (black) signals. The printer driver 103 then sends these signals to the interface, in the host computer 100, which is used for the printer apparatus 200 or the interface for a file storage unit or the like.

In this embodiment, the signals are output to the interface for the printer apparatus 200, and the data are sent to controller software 201 in the printer apparatus 200. Matching and the like between the set print mode and a head cartridge 203 are checked. Thereafter, the print data is transferred to engine software 202. In this case, the engine software 202 interprets the received data as data indicating the print mode and the data structure designated by the controller software 201, converts the print data into discharge pulses, and sends them to the head cartridge (printhead) 203. With this operation, coloring materials (inks) are discharged from the head cartridge 203. The ID information of the head cartridge 203, the ID information of each ink tank, and the like are sent to the engine software 202. On the basis of these pieces of information about the head cartridge 203, the engine software 202 assigns print buffers for storing print data of the respective colors, and optimizes various settings. The pieces of information are further sent to the host computer 100 and used as pieces of information for, for example, decoding data sent from the printer driver 103 by referring to the print mode and the like.

Figure 2:
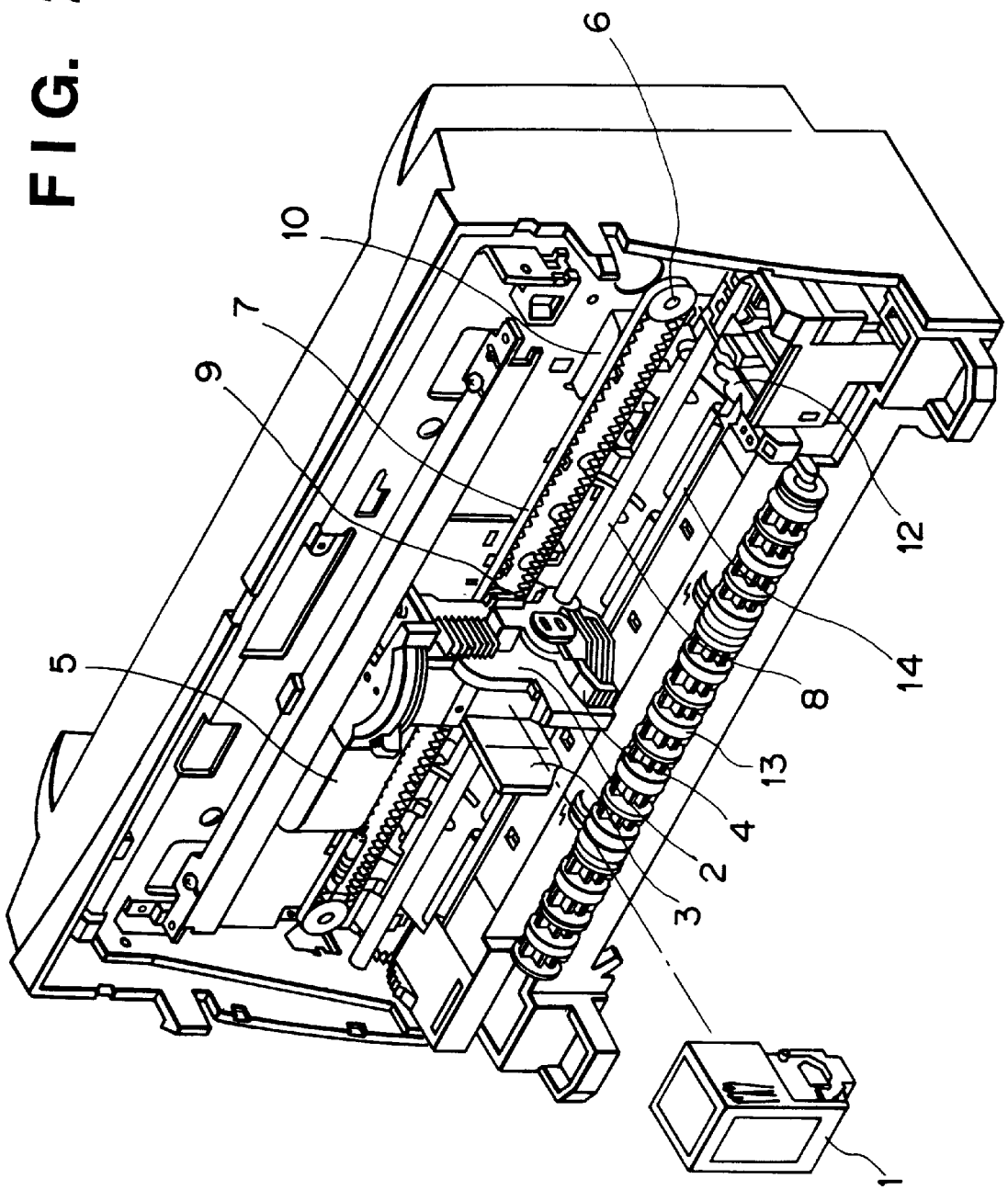
FIG. 2 is a perspective view showing the arrangement of the mechanical portion of the ink-jet printer apparatus of the embodiment from which the front cover is removed.

FIG. 2 shows the mechanical arrangement of the printer apparatus 200 using replaceable cartridges according to the preferred embodiment of the present invention, and more specifically, the ink-jet printer apparatus from which the front cover is removed to allow the interior of the printer apparatus to be seen.

Referring to FIG. 2, reference numeral 1 denotes a replaceable head cartridge (corresponding to the head cartridge 203 in FIG. 1) having an ink tank portion which contains an ink and a printhead; 2, a carriage unit which has the head cartridge 1 mounted thereon and moves laterally to perform a print operation; and 3, a holder for fixing the head cartridge 1 to the carriage unit 2. The holder 3 is interlocked with a cartridge fixing lever 4. That is, when the cartridge fixing lever 4 is operated after the head cartridge 1 is mounted in the carriage unit 2, the head cartridge 1 is pressed against the carriage unit 2. With this operation, positioning of the head cartridge 1 and electrical contact between the head cartridge 1 and the carriage unit 2 can be ensured. Reference numeral 5 denotes a flexible cable for transferring an electrical signal to the carriage unit 2; 6, a carriage motor which rotates to reciprocate the carriage unit 2 in the main scanning direction; 7, a carriage belt which is driven by the carriage motor 6 to move the carriage unit 2 laterally; 8, a guide shaft for slidably holding the carriage unit 2; 9, a home position sensor having a photocoupler which is used to position the carriage unit 2 to its home position; and 10, a light-shielding plate which allows detection of the home position. When the carriage unit 2 reaches the home position, the light-shielding plate 10 blocks the light from the photocoupler mounted on the carriage unit 2. As a result, it is detected that the carriage unit 2 has reached the home position. Reference numeral 12 denotes a home position unit including, for example, a restoring mechanism for a printhead 1 of the head cartridge 1; and 13, a paper discharge roller for discharging a printing medium. The printing medium is sandwiched between the paper discharge roller 13 and a spur unit (not shown) and discharged outside the printer apparatus. Reference numeral 14 denotes an LF unit for conveying the printing medium in the sub-scanning direction by a predetermined amount.

Figures 3A, 3B:
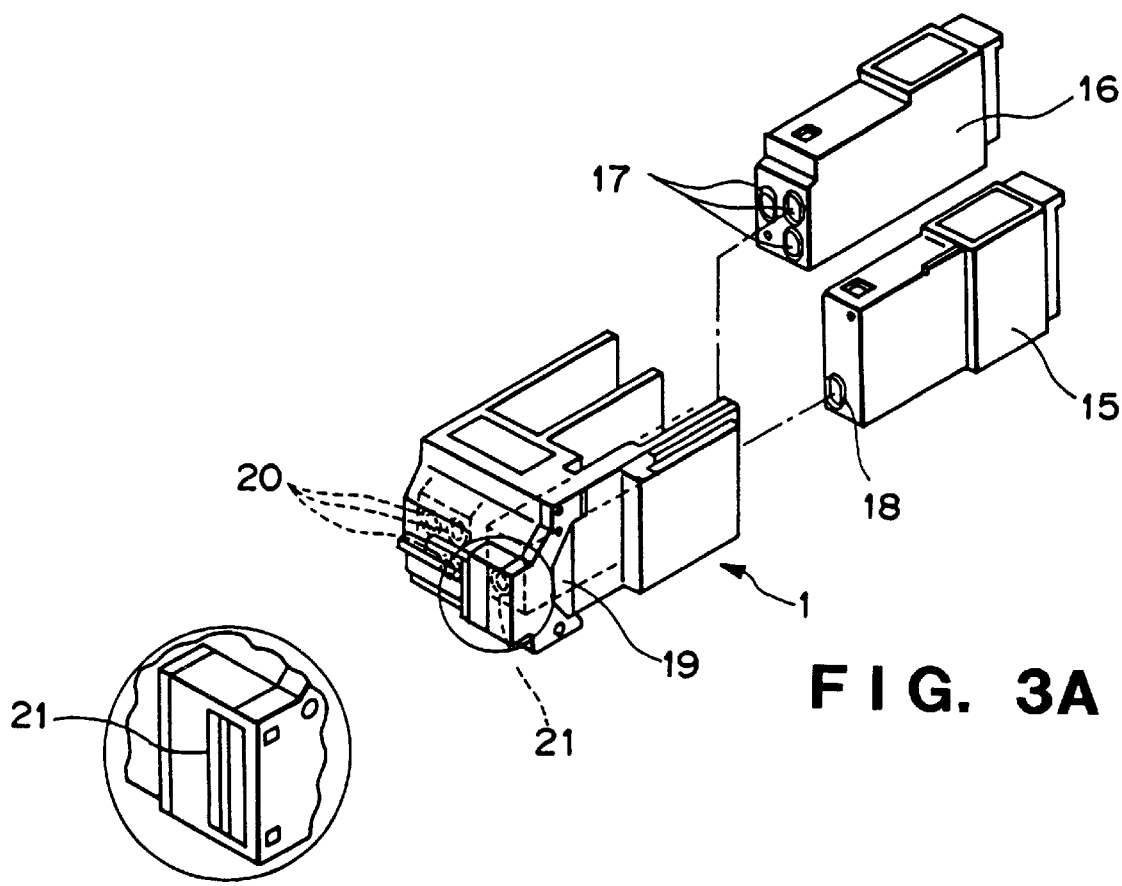
FIG. 3A is a perspective view showing the head cartridge and ink tanks of the ink-jet printer apparatus of the embodiment and FIG. 3B is an enlargement thereof.

FIG. 3 shows the detailed structure of the head cartridge 1 used in the embodiment of the present invention.

Referring to FIG. 3, reference numeral 15 denotes a replaceable black (Bk) ink tank; 16, a replaceable ink tank containing C, M, and Y coloring materials; 17, coupling ports (coloring material supply ports) of the ink tank 16, which are coupled to the head cartridge 1 to supply the coloring materials; and 18, a coupling port (coloring material supply port) of the ink tank 15. The coupling ports 17 and 18 are designed to be coupled to supply pipes 20 to supply the coloring materials. Reference numeral 19 denotes a contact portion for electrical signals, which is connected to the flexible cable 5 to transfer various signals to the head cartridge 1.

Figure 4A:
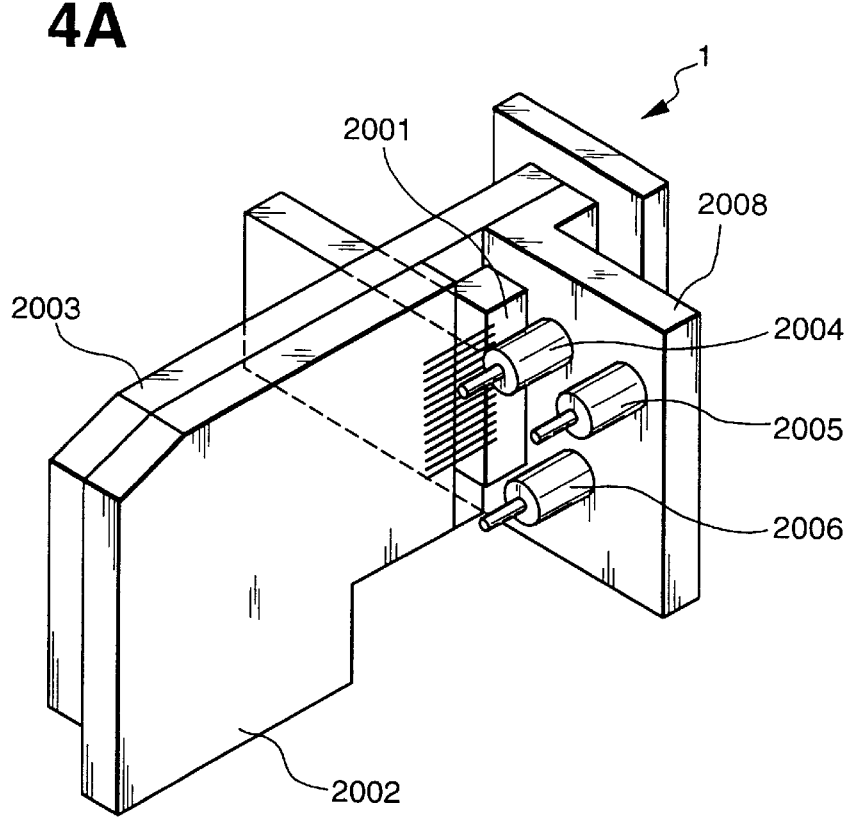
FIGS. 4A and 4B are perspective views showing the mechanical arrangement of the printhead of the ink-jet printer apparatus of the embodiment.
Figure 4B:
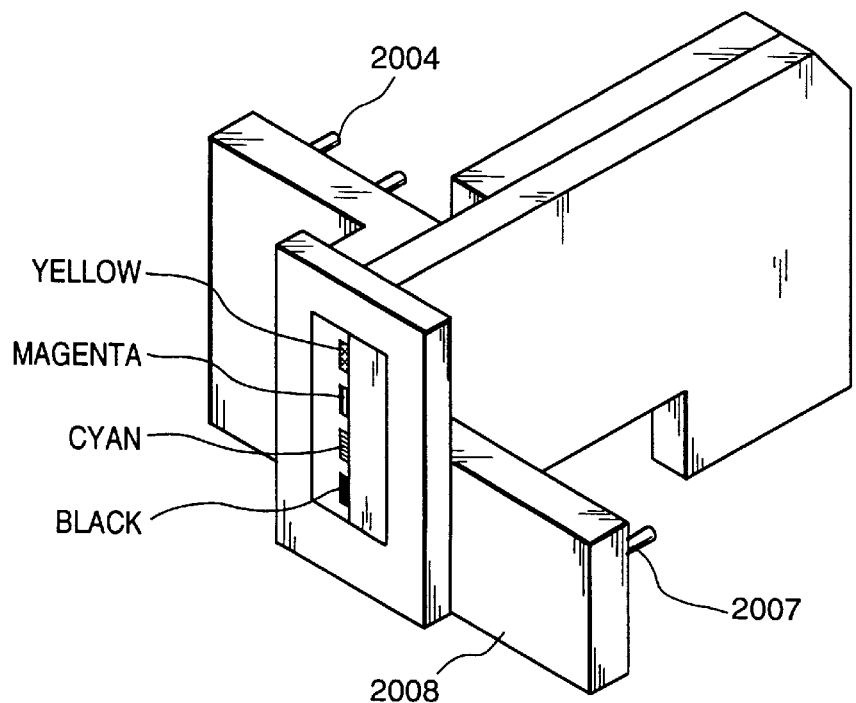

FIGS. 4A and 4B show the structure of the printhead 1 according to the embodiment. FIG. 4A is a perspective view showing the outer appearance of the printhead 1 when viewed from the rear side. FIG. 4B is a perspective view showing the printhead 1 when viewed from the front side.

Orifice groups corresponding to the respective colors, i.e., yellow, magenta, cyan, and black, are arranged in a line on the front surface portion of the printhead 1. Each of the orifice groups for yellow, magenta, and cyan consists of 24 orifices (nozzles). The orifice group for black consists of 64 orifices (nozzles). The nozzle groups for the respective colors are arranged at a pitch of one nozzle or more.

The printhead 1 has ink channels communicating with the respective orifices. A common liquid chamber is formed behind the ink channels to supply inks thereto. Electrothermal converters for generating heat energy used to discharge the inks from these orifices, and an electrode wiring pattern for supplying power thereto are arranged in the ink channels corresponding to the respective orifices. These electrothermal converters (discharge heaters) and the electrode wiring pattern are formed on a board 2001 consisting of silicon or the like by a film forming technique. Partition walls, a ceiling plate, and the like consisting of resin and glass materials are stacked on the board 2001 to form the above orifices, the ink channels, and the common liquid chamber. A driving circuit for driving the electrothermal converters in accordance with print signals is mounted in the form of a printed board behind the board 2001.

Instead of using the above glass material or the like, a grooved ceiling plate (orifice plate) having partition walls, a common liquid chamber, and the like formed thereon to define the respective ink flow paths may be bonded to the board 2001. In this case, the grooved ceiling plate is formed by integral molding. As a molding material, polysulfone is preferably used. However, other molding resin materials may be used.

The board 2001 and a printed board 2002 are mounted parallel to an aluminum plate 2003 having the same shape as that of the printed board 2002. Pipes 2004 to 2007 extend from a plastic member 2008 called a distributor extending in a direction perpendicular to the board 2001, and communicate with the channels in the plastic member 2008. The channels communicate with the common liquid chamber. There are four channels for yellow, magenta, cyan, and black in the plastic member 2008. The channels communicate with the common liquid chamber for the inks of the respective colors and the pipes 2004 to 2007.

In the embodiment, the ink tanks for the color inks and the black (Bk) ink are independently prepared and independently replaceable. However, the head cartridge obtained by integrating the ink tanks 15 and 16 and the printhead 1 may be used.

About 40 ng of an ink are discharged from each of the orifices for yellow, magenta, and cyan arranged in the printhead 1 in the embodiment, whereas about 80 ng of an ink are discharged from the orifice for black (Bk).

The following are examples of the compositions of the inks used in the ink-jet printer apparatus of the embodiment:

1. Y (yellow):

| | |
|---|---|
| Direct Yellow CI 86 | 3 parts by weight |
| diethylene glycol | 10 parts by weight |
| isopropyl alcohol | 2 parts by weight |
| urea | 5 parts by weight |
| Acetylenol EH (Kawaken Chemical) | 1 part by weight |
| water | balance |

2. M (magenta):

| | |
|---|---|
| Acid Red CI 289 | 3 parts by weight |
| diethylene glycol | 10 parts by weight |
| isopropyl alcohol | 2 parts by weight |
| urea | 5 parts by weight |
| Acetylenol EH (Kawaken Chemical) | 1 part by weight |
| water | balance |

3. C (cyan)

| | |
|---|---|
| Direct Blue CI 199 | 3 parts by weight |
| diethylene glycol | 10 parts by weight |
| isopropyl alcohol | 2 parts by weight |
| urea | 5 parts by weight |
| Acetylenol EH (Kawaken Chemical) | 1 part by weight |
| water | balance |

4. Bk (black):

| | |
|---|---|
| Direct Black CI 154 | 3 parts by weight |
| diethylene glycol | 10 parts by weight |
| isopropyl alcohol | 2 parts by weight |
| urea | 5 parts by weight |
| water | balance |

As described above, unlike the black (Bk) ink, 1% of Acetylenol EH is added to each of the C, M, and Y inks to improve its permeability. As an additive, a surfactant, alcohol, or the like other than the above compound is available.

In the embodiment, the printhead 1 is made to hold information indicating whether it contains a thick ink having a high density or a thin ink having a low density. The ink-jet printer apparatus main body identifies the information.

Figure 5:
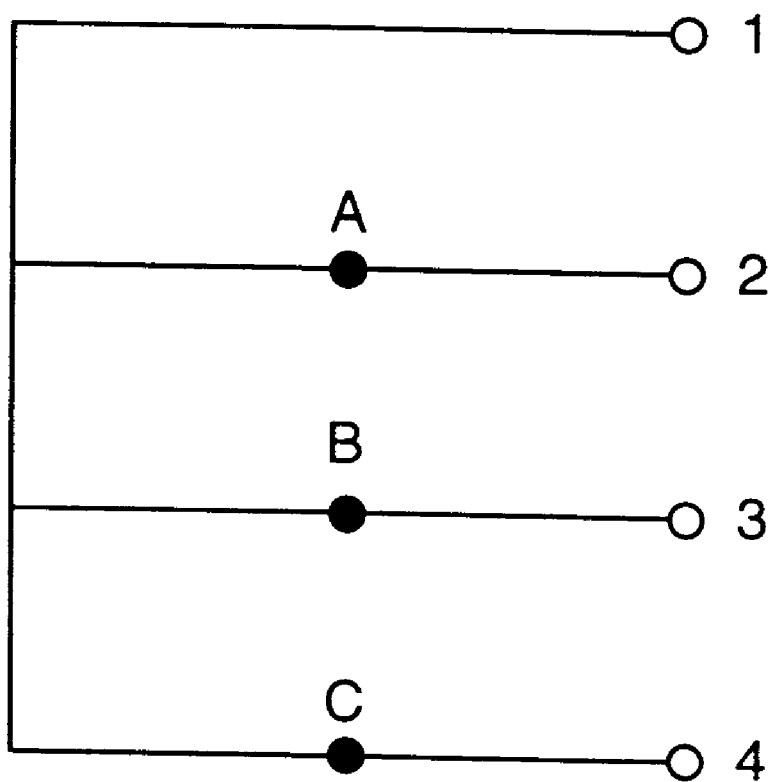
FIG. 5 is a view showing a circuit arrangement for discriminating the type of ink in the printhead in the embodiment.

FIG. 5 is a wiring diagram for explaining a means of identifying the ink information of the printhead 1 according to the embodiment.

The wiring pattern shown in FIG. 5 is formed in the head cartridge 1. Any one of points A, B, and C in FIG. 5 is disconnected in accordance with the type of ink contained in the printhead 1.

In the ink-jet printer apparatus main body, a voltage is applied between terminals 1 and 4 of this circuit to identify the type of ink in the printhead 1 depending on whether the terminal 1 and a terminal 2 are disconnected from each other (high density), the terminal 1 and a terminal 3 are disconnected from each other (low density), or the terminal 1 and the terminal 4 are disconnected from each other (normal) in the wiring pattern in FIG. 5 which is formed in the printhead 1.

The contact portion 19 has a plurality of pads. Signals associated with ink discharging operations, an ID signal for identifying the head cartridge 1, and the like are exchanged between the head cartridge 1 and the ink-jet printer apparatus main body through the pads of the contact portion 19.

Another method of detecting the type of ink tank in the head cartridge 1 used in the embodiment will be described below.

Figure 7B:
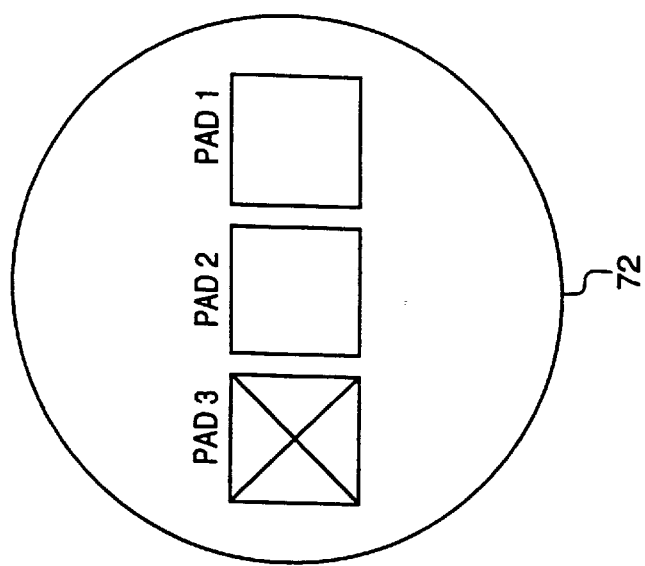
FIG. 7A is a view for explaining the arrangement of the printhead in a case wherein an ink tank is detachably mounted in the printhead and FIG. 7B is an enlargement thereof.
Figure 7A:
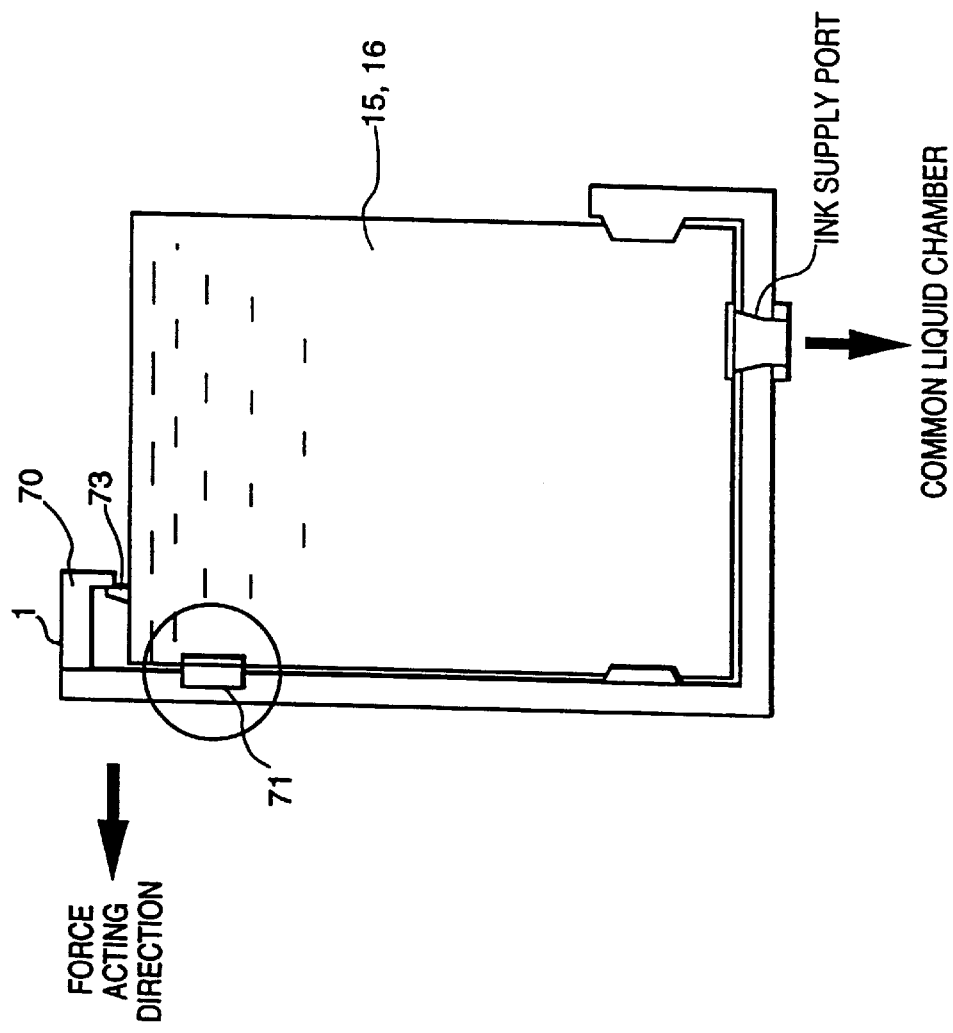

FIG. 7 is a view for explaining the method of detecting the type of ink tank in the head cartridge 1 used in the embodiment.

When the ink tank 15 (or 16) is mounted in the head cartridge 1, and a hook 70 is engaged with a projection 73 of the tank, the ink tank 15 is fixed on the head cartridge 1. Contact portions 71 for detecting the type of ink tank mounted are formed in the direction in which the force of the hook 70 acts. The tank detecting contact portions 71 are formed on both the head cartridge 1 side and the ink tank 15 (or 16) side. Referring to FIG. 7, reference numeral 72 indicates an enlarged view of the contact portion 71, which has three pads 1, 2, and 3. Although not shown, similar pads equal in number to the above pads are formed on the head cartridge 1 side. These pads are electrically connected to each other on the contact portions 71. Assume that on the contact portion on the ink tank 15 (or 16) side, the pads 1 and 2 are set conductive, but the pad 3 is insulated. Assume that this state indicates an ink tank containing a normal ink. In this case, the ink-jet printer apparatus of the embodiment is electrically connected to these pads through the contact portion on the head cartridge 1 side which is in contact with the pads to detect the type of ink contained in the ink tank mounted in the printer apparatus main body.

In the case shown in FIG. 7, a current flows between the pads 1 and 2, but no current flows between the pads 1 and 3 and between the pads 2 and 3. Information indicating this state is stored in advance in a ROM or the like in the ink-jet printer apparatus main body as information indicating that a normal ink tank is mounted. In contrast to this, on an ink tank containing a thin ink, for example, the pad 3 is set conductive to allow the printer apparatus to identify the ink tank different from the normal ink tank.

In the embodiment, the number of pads for identifying an ink tank is three. If, however, four or more pads are used, more types of ink tanks can be identified.

Figure 6B:
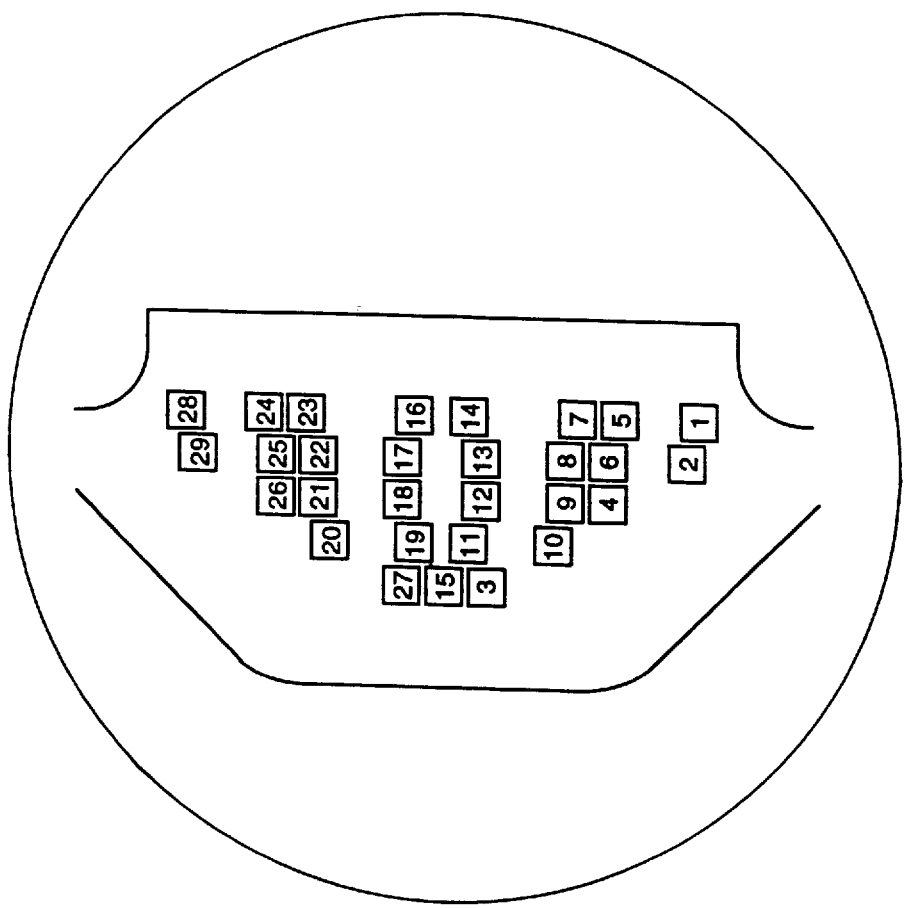
FIG. 6A is a view showing the contact portion of the head cartridge in the ink-jet printer apparatus of the embodiment and FIG. 6B is an enlargement thereof.
Figure 6A:
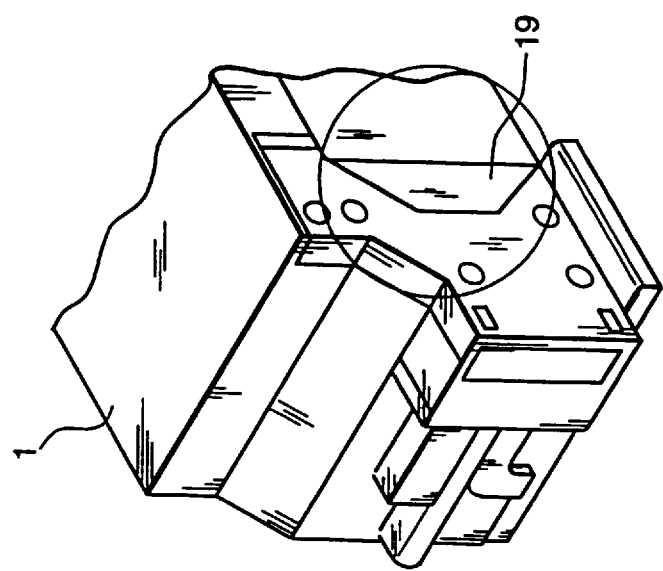

In addition, whether the head cartridge 1 is replaced can be detected by checking the conductive state through the contact portion 19 shown in FIGS. 5 and 6.

[First Embodiment]

Figure 8:
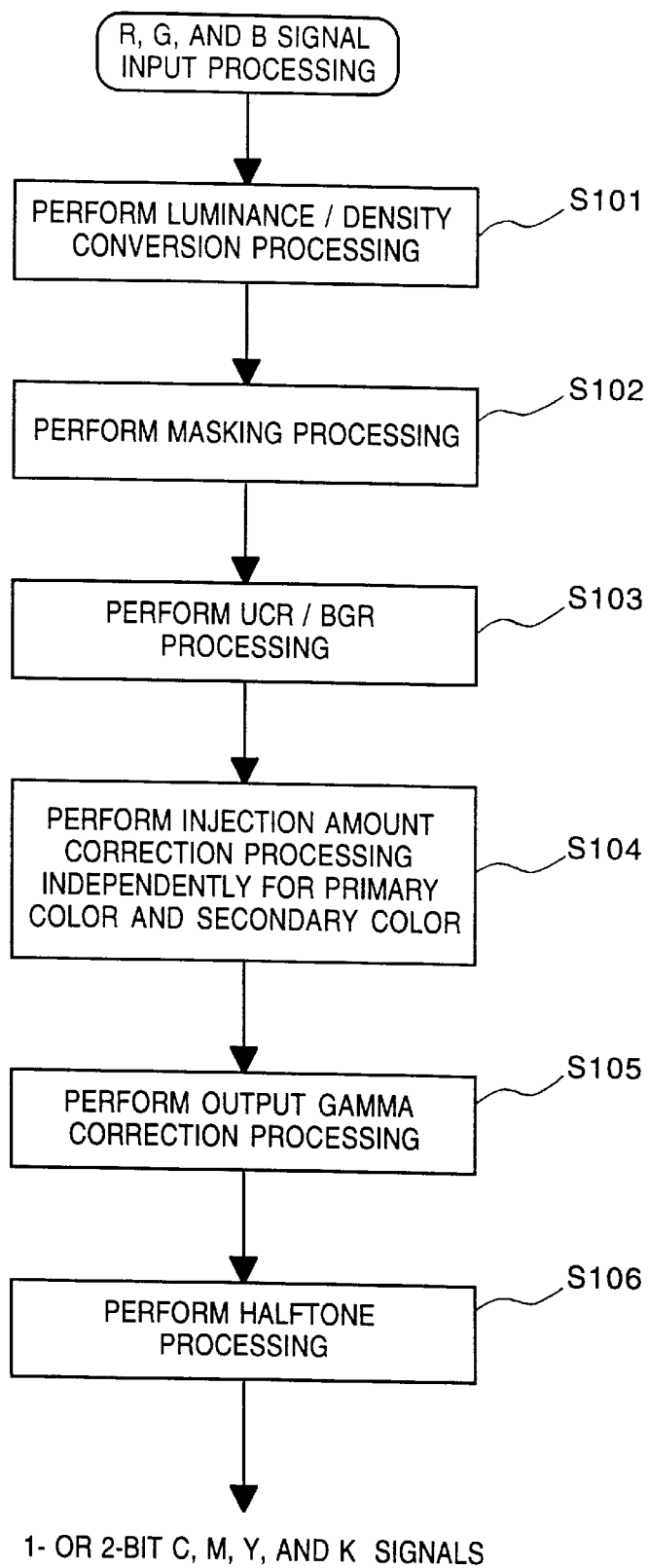
FIG. 8 is a flow chart showing the processing performed by a color processing module in a printer driver in the embodiment.

FIG. 8 is a flow chart showing an example of image processing performed by an image processing module in a printer driver 103 according to the first embodiment of the present invention.

In step S101, luminance/density conversion is performed to convert R, G, and B luminance signals, i.e., 8-bit R, G, and B signals, i.e., input signals consisting of a total of 24 bits, into C, M, and Y signals, i.e., 8-bit C, M, and Y signals, i.e., signals consisting of a total of 24 bits, or C, M, Y, and K density signals consisting of a total of 32 bits. In step S102, masking is performed to correct unnecessary color components of the pigments in the C, M, and Y coloring materials. In step S103, UCR/BGR processing is performed to remove undercolors and extract black components. In step S104, for each pixel, primary and secondary color coloring materials are limited to different injection amounts. In this case, the primary and secondary color coloring materials are limited to 300% and 400%, respectively.

In step S105, output gamma correction is performed to make the output characteristics linear. Up to this processing, the 8-bit multivalued outputs of the respective colors are used. In step S106, halftone processing is performed for the 8-bit signals to convert the C, M, Y, and K data into 1- or 2-bit signals. In this case, in step S106, halftone processing is performed by using the error diffusion method, the dither method, or the like.

FIG. 9 shows the classification of the contents of control selectively executed by the control unit of the printer apparatus on the basis of the head identification signal or the ink tank identification signal (ID signal) from a contact portion 19 of the head cartridge 1.

In the first embodiment, the four types of cartridges are identified on the basis of ID data. FIG. 9 shows only the three types of cartridges (color cartridges). ID=0 (not shown) indicates a monochrome cartridge, whereas ID=1, 2, or 3 indicates a color cartridge. That is, FIG. 9 shows an example of the classification of color cartridges. In this case, as the ID number increases, the pigment density of at least one of the coloring materials decreases.

Assume that in the first embodiment, the cartridge indicated by ID=1 is the head cartridge of the pigment densities (high densities) used in a conventional color printer. ID=2 indicates the head cartridge or ink tank used in this embodiment and containing coloring materials having low pigment densities except for the yellow coloring material. ID=3 indicates the head cartridge or ink tank containing inks having lower pigment densities, which is used in the embodiment to print a high-quality pictorial image.

First of all, on the basis of the ID values defined in this manner, the printer apparatus recognizes the differences in pigment density. In this case, the differences in pigment density mean the differences in maximum optical reflection density between the respective primary color coloring materials, and may accompany changes in pigments themselves. In this sense, these ID values can indicate the differences in maximum optical reflection density or maximum saturation between the respective primary color coloring materials. For the sake of descriptive convenience, in the first embodiment, the ID values indicate the differences in pigment density.

In the cartridges indicated by ID=1 and ID=2, the yellow coloring materials have the same pigment density (2.5%). The pigment density of magenta corresponding to ID=2 is ⅓ that of magenta corresponding to ID=1. The pigment density of cyan corresponding to ID=2 is ⅓ that of cyan corresponding to ID=1. The pigment density of K (Bk) corresponding to ID=2 is about ½ that of K (Bk) corresponding to ID=1. In the cartridges indicated by ID=1 and ID=3, the yellow coloring materials have the same pigment density (2.5%). The pigment density of magenta corresponding to ID=3 is about ¼ that of magenta corresponding to ID=1. The pigment density of cyan corresponding to ID=3 is about ¼ that of cyan corresponding to ID=1. The pigment density of K (Bk) corresponding to ID=3 is about ¼ that of K (Bk) corresponding to ID=1.

Figure 10:
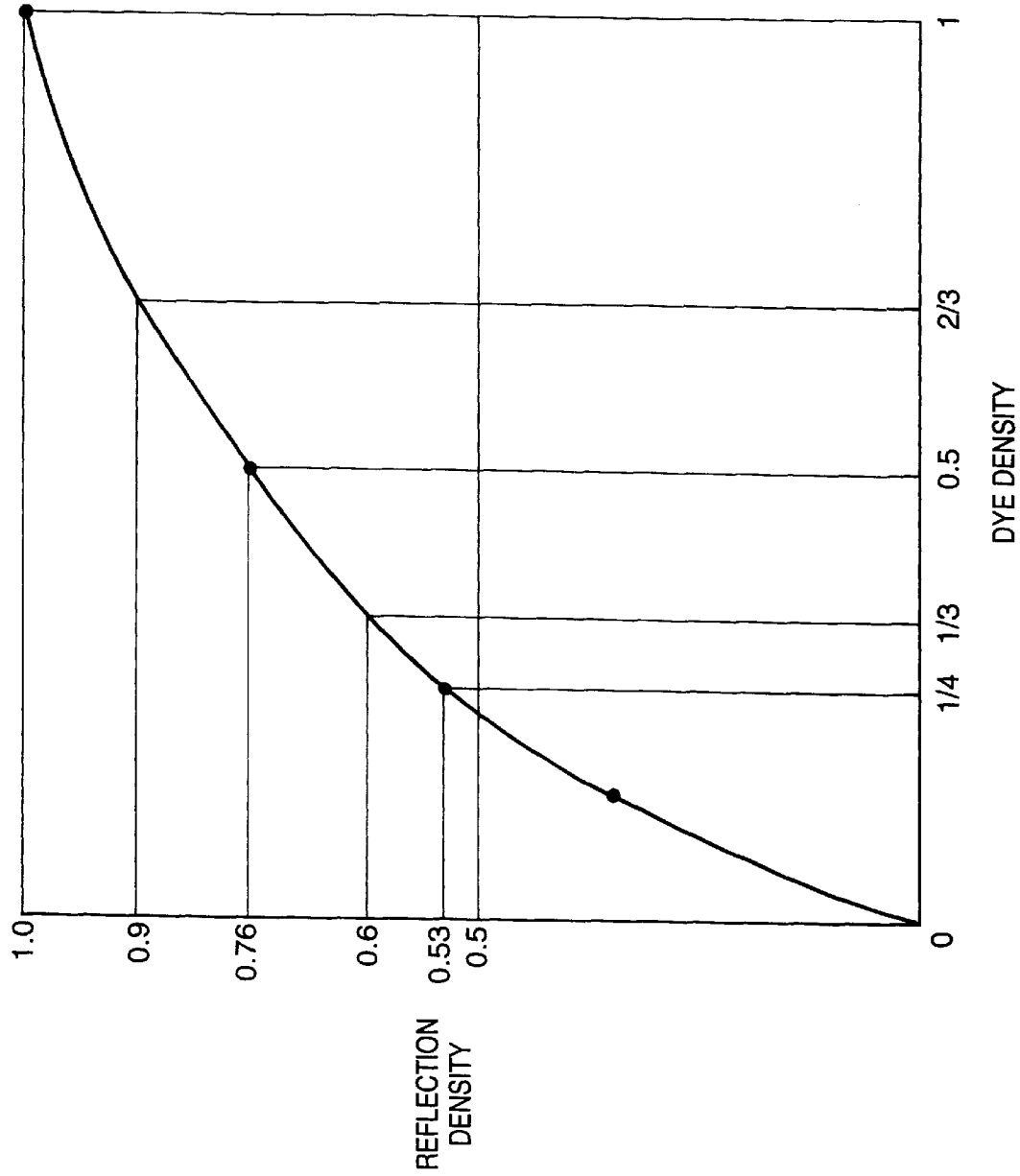
FIG. 10 is a graph for explaining the relationship between the dye (pigment) density of an ink and the reflection density in the embodiment.

As shown in FIG. 10, in the first embodiment, when the pigment density is set to ½, the optical reflection density is about 76%. When the pigment density is set to ⅓, the optical reflection density is about 60%. When the pigment density is set to ¼, the optical reflection density is about 53%. When the pigment density is set to ¾, the optical reflection density is about 90%. This relationship between the pigment density and the optical reflection density is almost constant regardless of the type of color.

Referring to FIG. 9, the data in "DATA" indicates the depth of the structure of data corresponding to each ID data and sent from the printer driver 103 to a printer apparatus 200. This data is changed to change the maximum injection amount while increasing the gradation level of the print data with changes in the pigment densities of the respective coloring materials. This change may be accompanied by a change in the amount of coloring material discharged from the head cartridge. In this case as well, the data in "DATA" is basically determined on the basis of the amount of coloring material, i.e., pigment, injected per unit area. This operation is also included in the scope of the present invention. Assume that in this embodiment, the amount of ink discharged is constant. In the embodiment, the resolution is set to 360×360 dip regardless of the ID value. When ID=1, binary data is set. When ID=2, quaternary data is set. When ID=3, quinary data is set.

Even if the resolution is increased while the gradation level of data is fixed regardless of the ID value, almost the same effects as those in this embodiment, in which the gradation level is increased, can be obtained.

The data in "CORRESPONDING MEDIA" indicates the types of media (printing media) suited for a head cartridge 1 indicated by each ID value.

Various criteria for selection of corresponding media may be set. In this case, corresponding media are discriminated on the basis of the differences in maximum coloring material absorbing capacity. In this embodiment, the maximum coloring material absorbing capacity of a pictorial medium (pictorial paper) is about 500%, and the maximum coloring material absorbing capacity of coated paper is about 400%, which is the second largest. The maximum coloring material absorbing capacity of plain paper is about 200%, which is the smallest.

The data in "MAXIMUM INJECTION AMOUNT" in FIG. 9 vary depending on C, M, Y, and K coloring materials and R, G, and B coloring materials. The numerical values in "MAXIMUM INJECTION AMOUNT" represent the maximum injection amounts limited in the printer driver 103 in units of pixels. That is, the surface density of a coloring material is changed for each density to set almost the same pigment amount at portions exhibiting the same density. A characteristic feature of this embodiment (ID=2 and 3) is that the maximum injection amount of the secondary color coloring material (R, G, or B) is less than twice that of the primary color coloring material (C, M, Y, or K), unlike the prior art (ID=1).

As is apparent from FIG. 9, the data in "PIGMENT DENSITY" and "MAXIMUM INJECTION AMOUNT" are changed according to the following relationship.

The pigment densities of chromatic coloring materials, i.e., cyan, magenta, and yellow (to be referred to C, M, and Y hereinafter) coloring materials, having almost the same hue (almost the same color) corresponding to different ID values are compared to obtain at least one high pigment ratio and one low pigment ratio. The maximum injection amount is then changed to be equal to or higher than the sum of the maximum and minimum ratios.

When, for example, the cartridge indicated by ID=1 is compared with the cartridge indicated by ID=2, the colors of the coloring materials having almost the same hue and exhibiting the maximum pigment density ratios are C and M. The ratio between the M coloring materials is "3", and the ratio between the C coloring materials is also "3" (maximum value). The Y coloring materials exhibit the minimum value, which is "1". The sum of the maximum and minimum is "4". In this case, therefore, the maximum injection amount is set to equal to or higher than 4 (=3+1) times that in the prior art, i.e., 400%. More specifically, in the cartridge indicated by ID=2, the maximum injection amount of each of the primary color coloring materials (C, M, and Y) is set to "300%", and that of each of the secondary color coloring materials (R, G, and B) is set to "400%" with respect to those in the cartridge indicated by ID=1.

By determining the maximum injection amounts in this manner, an image having almost the same optical reflection density as that of an image obtained by using the head cartridge indicated by ID=1, which contains inks having high pigment densities, can be obtained by using the primary color coloring materials of C and M. In addition, since the Y coloring material has the same pigment density as that in the cartridge indicated by ID=1, the maximum injection amount need not be changed from "100%". In the case shown in FIG. 10, therefore, when an ink having a dye density of ⅓ is discharged three times that in a dye density of ¼ (normal case) to print an image, the amount of dye discharged becomes about three times that in the normal case. Since water such as a dilute solution is absorbed by the printing medium and evaporated, the resultant image has an optical reflection density almost three times that in the normal case. As is apparent from FIG. 10 as well, when the dye density is ⅔ or more, the reflection density becomes "0.9" or more and almost saturated. For this reason, there is no conspicuous difference in reflection density between the images obtained with different dye densities.

Consider secondary colors, e.g., red, green, and blue (to be referred to as R, G, and B hereinafter) next. The maximum injection amounts corresponding to these secondary colors correspond the ink absorbing capacities of media (printing media). In the case shown in FIG. 9, the plain paper has the smallest absorbing capacity (200%), and the coated paper has the next smallest capacity (400%). The pictorial paper has the largest ink absorbing capacity (500%).

Consider R first. The R coloring material is expressed by (M+Y) using ink pigments. In this case, as described above, since the Y coloring material has a high pigment density (high lightness), the maximum injection amount is 100%. In addition, the maximum injection amount of the M coloring material is set to 300%. Therefore, the maximum injection amount of the R, i.e., (M+Y), coloring material is 400%. Almost the same optical reflection density as the R value corresponding to ID=1 can be obtained. Similarly, G is expressed by (C+Y). Since the maximum injection amount of the C coloring material is set to 300%, the maximum injection amount of the G coloring material is set to 400%. With this setting, an image having almost the same optical reflection density as that of an image obtained with the G coloring material corresponding to ID=1 can be obtained. Consider B next. Since B is expressed by (C+M), the maximum injection amount of the B coloring material is set to 600% (=300% +300%). In this case, however, an increase in optical reflection density is small relative to an increase in ink injection amount. For this reason, in practice, the maximum injection amount is set to 400% (C+M=200%+200%). With this setting, the optical reflection density of the printed image is about 90% that of an image obtained by using the head cartridge indicated by ID=1.

Similar calculations are performed when the head cartridge indicated by ID=3 is used. That is, according to the relationship between ID=1 and ID=3, the maximum injection amounts of primary color coloring materials (C and M) are set to 400%, and the maximum injection amounts of the secondary color coloring materials (R, G, and B) are set to 500% or more. In this case, almost the same optical reflection densities as those corresponding to ID=1 can be obtained with the secondary color coloring materials except for the B coloring material. When the maximum injection amount of the B coloring material is set to 500%, however, the optical reflection density is slightly lower than that corresponding to ID=1. The maximum injection amount of the B coloring material may therefore be set to 600%. In any case, when the maximum injection amounts are changed in this manner, the data in "CORRESPONDING MEDIA" are limited, as shown in FIG. 9. A pictorial image can therefore be obtained by decreasing the pigment densities, changing the maximum injection amounts in accordance with the pigment densities, and using the optimal "corresponding medium" for the pictorial image.

With the above operation, the optimal effects can be obtained by changing the maximum injection amounts. In practice, even if the maximum injection amounts with respect to the medium cannot be changed to ideal amounts, image design may be performed with respect to an output data curve (ID=2-q) to slightly lower its level from the ideal level by clipping (ID=2-b) data at high gradation levels (high densities) of data to be output in response to an input or using a high-order curve.

Even if an increase in maximum injection amount is suppressed by clipping data in the above manner, effects equivalent to those in the ideal state can be obtained up to a certain gradation level. In this case, the pigment density per unit area can be kept almost constant regardless of the type of coloring material before clipping.

Figure 11A:
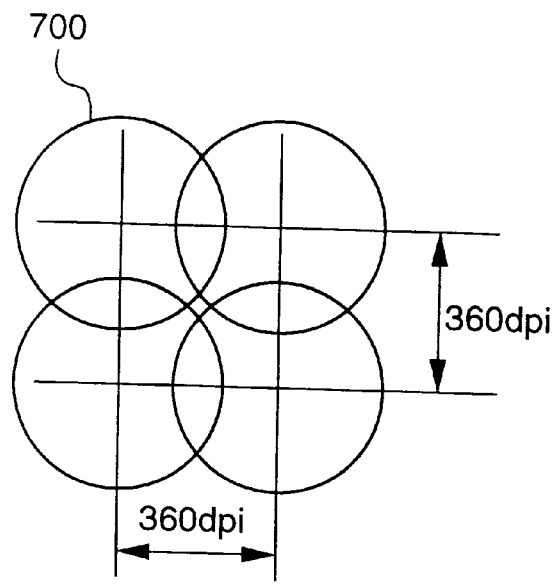
Figure 11B:
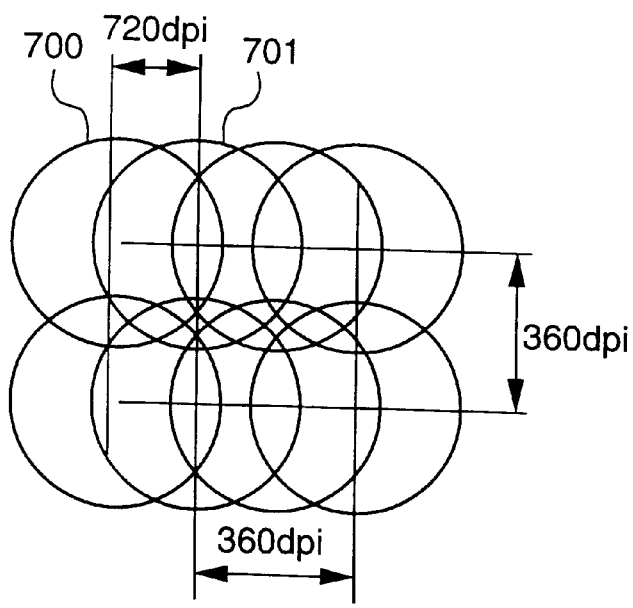

FIGS. 11A and 11B explain the layouts of dots printed in the first embodiment.

FIG. 11A shows the layout of dots on a printing medium in a case wherein binary data is printed at 360 dpi×360 dpi. FIG. 11B shows the layout of dots on a printing medium in a case wherein quaternary or quinary data is printed at 360 dpi×360 dpi.

In the case shown in FIG. 11A, the injecting ratio is set such that one dot is printed on each pixel. This injecting ratio is defined as 100%. In the case shown in FIG. 11B, therefore, the injecting ratio is 200%. Note that when the amount of ink discharged is to be changed in each cartridge, a value obtained when 100% is multiplied by the changed ratio may be set to perform a print operation regardless of the type of data, i.e., binary, quaternary, or quinary data, even if all the dots corresponding to the respective pixels are present.

FIGS. 12A to 12C show the relationship between the data form and the layout of dots actually printed on a printing medium by the printer apparatus 200 of the first embodiment.

FIG. 12A shows 360-dpi binary data. FIG. 12B shows 360-dpi quaternary data. FIG. 12C shows 360-dpi quinary data. In this case, the binary data in FIG. 12A is printed according to the dot layout shown in FIG. 11A. The respective pixel data and the printed dots exhibit a one-to-one correspondence. Therefore, when data is "0", no dot is printed, whereas when data is "1", one dot is printed at a corresponding pixel position corresponding to 360 dip×360 dpi. In this embodiment, such a printing method is executed when the head cartridge 1 indicated by ID=1 is mounted in the printer apparatus to perform a print operation.

FIG. 12B shows a print operation using quaternary data which is executed when the head cartridge 1 indicated by ID=2 is mounted in the printer apparatus. In this case, a dot (denoted by reference numeral 700 in FIGS. 11A and 11B) is printed at an address corresponding to 360 dpi×360 dpi, and a sub-dot (denoted by reference numeral 701 in FIG. 11B) is also printed at an address corresponding to 720 dpi×360 dpi. In this case, data is supplied through a 2-bit signal. When data is "00", no dot is printed. When data is "01", one dot is printed at an address corresponding to 360 dpi×360 dpi. When data "10", the data is decoded in the ink-jet printer apparatus to print one dot at an address (700) corresponding to 360 dpi×360 dpi and one dot at an address (701) corresponding to 720 dpi×360 dpi. This state corresponds to 200% ink injection at 360 dpi×360 dip (FIG. 11A). When data is "11", two dots printed at an address (700) corresponding to 360 dpi×360 dpi in an overlapping state, and one dot is printed at an address (701) corresponding to 730 dpi×360 dpi, thereby realizing 300% ink injection relative to the injection operation in FIG. 11A.

FIG. 12C shows the case wherein 4-bit data is output as quinary data. However, another method may be used. The print operation in FIG. 12C differs from that in FIG. 12B in that when quinary data is "111", two dots are printed in an overlapping state at both an address (700) corresponding to 360 dpi×360 dpi and an address (701) corresponding to 720 dpi×360 dpi. With this operation, when quinary data is used, a primary color ink can be injected at a maximum of 400%. As is apparent, the data may be decoded to print dots, as in the case shown in FIG. 12B.

In order to execute the above printing method with the increased gradation level, two dots must be printed in an overlapping state at each pixel position. For this reason, a print operation must be performed by a known multi-pass method.

According to another embodiment, a print operation may be performed with the same number of passes or by the multi-pass method by increasing the density of print elements in units of cartridges. Assume that a head cartridge having print elements arranged at a 360-dpi pitch has been used, and the gradation level is to be increased. In this case, a print operation may be performed by using a head cartridge having print elements arranged at a 720-dpi pitch.

Figure 13:
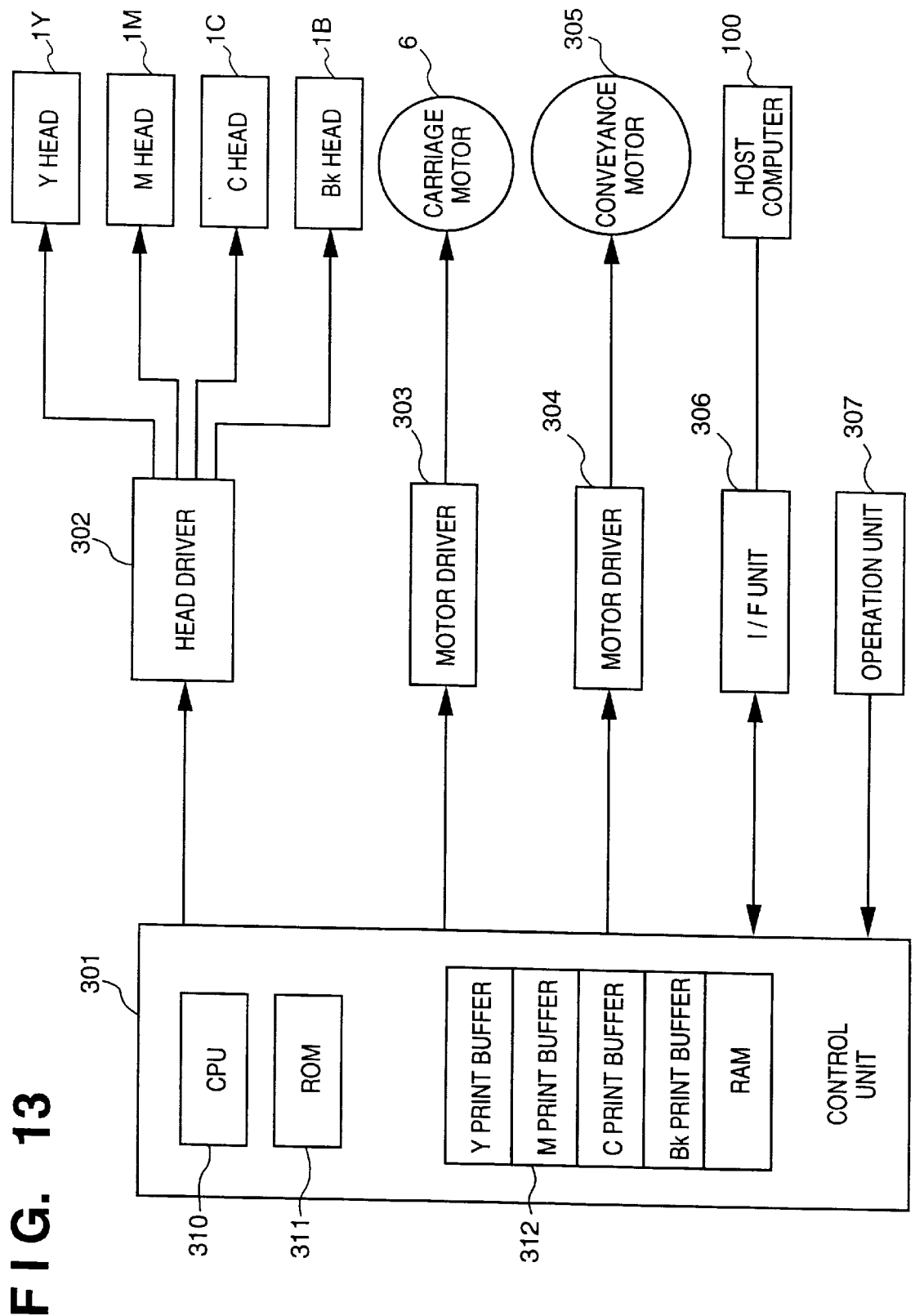
FIG. 13 is a block diagram showing the arrangement of an ink-jet printer apparatus according to the first embodiment of the present invention.

FIG. 13 is a block diagram showing the arrangement of the printer apparatus 200 of the first embodiment. The same reference numerals in FIG. 13 denote the same parts as in the above drawings.

Reference numeral 301 denotes a control unit for controlling the overall operation of the printer apparatus. The control unit 301 includes a CPU 310 such as a microprocessor, a ROM 311 storing control programs executed by the CPU 310 and various data, a RAM 312 which is used as a work area when the CPU 310 executes various processes and temporarily stores various data, and the like. The RAM 312 incorporates a reception buffer for storing print codes received from a host computer 100 and print buffers corresponding to Y, M, C, and B and storing print data (image data) in correspondence with yellow, magenta, cyan, and black printheads 1Y, 1M, 1C, and 1B for printing Y, M, C, and Bk images, respectively.

Reference numeral 302 denotes a head driver for driving the yellow printhead 1Y, the magenta printhead 1M, the cyan printhead 1C, and the black printhead 1B in accordance with print data of the respective colors which are output from the control unit 301; 303 and 304, motor drivers for rotating/driving the carriage motor 6 and a conveyance motor 305, respectively; 306, an interface (I/F) unit for controlling the interface between the printer apparatus 200 of this embodiment and the host computer 100; and 307, an operation unit having various keys operated by the user and a display unit such as a liquid crystal display.

Figure 14:
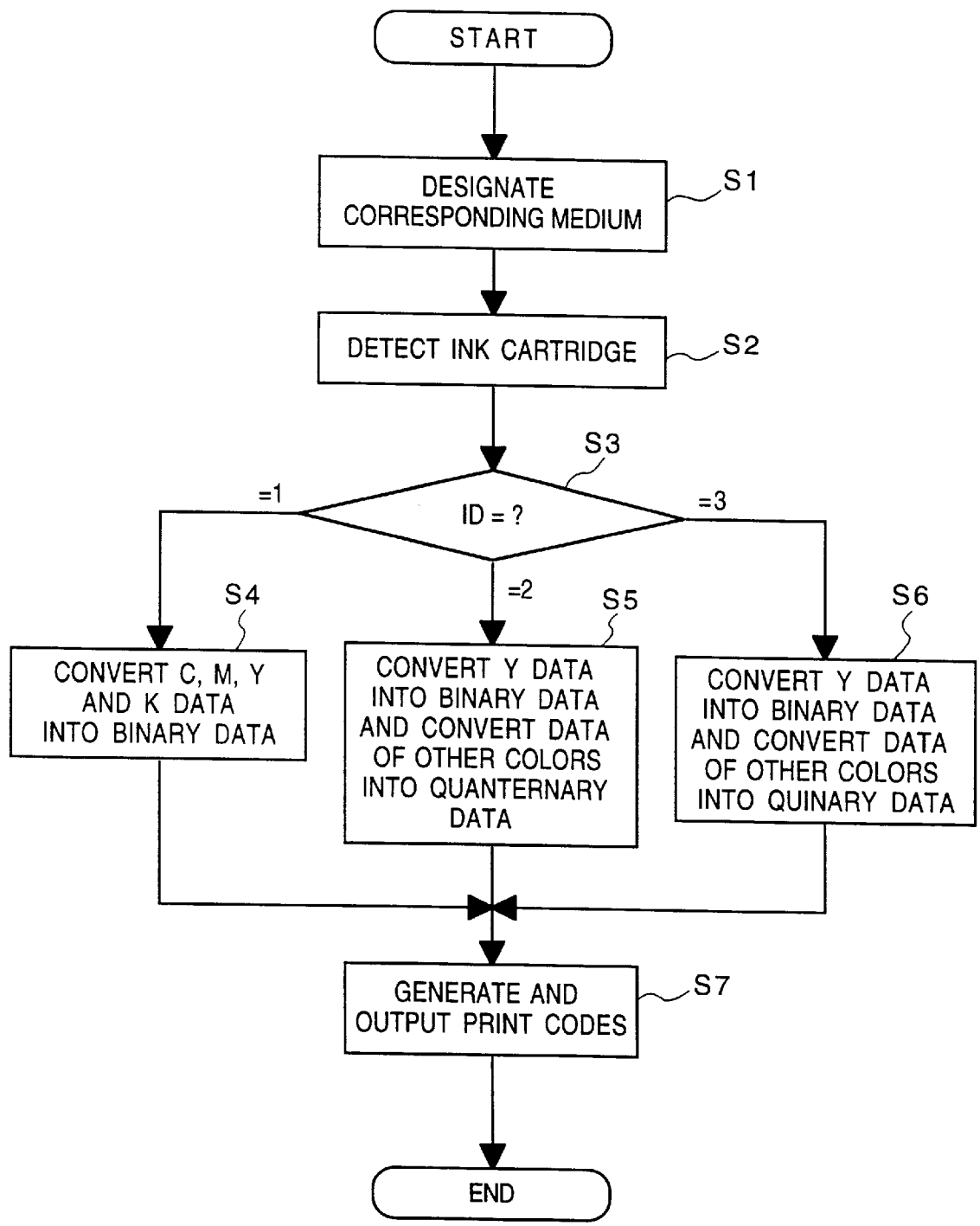
FIG. 14 is a flow chart showing the print code generation processing performed by the printer driver of the host computer in the first embodiment.

FIG. 14 is a flow chart showing a print code generation processing executed by the host computer 100 in the first embodiment. For example, this processing is executed by the printer driver 103.

In step S1, the type of printing medium to be used in the printer apparatus 200 is designated. In step S2, the type (ID data) of the head cartridge 1 mounted in the printer apparatus 200 is determined on the basis of a signal from the printer apparatus 200. For example, determination of the type of cartridge, designation of the type of printing medium, and the like are performed by setting a mode and the like of the printer apparatus 200 on the window displayed by the OS 101 of the host computer 100. In step S3, the type of the head cartridge 1 mounted in the printer apparatus 200 is checked. If, for example, the cartridge indicated by ID=1 is mounted, the flow advances to step S4 to binarize the image data of the respective color components as in a known conventional method.

If it is determined in step S3 that the head cartridge 1 indicated by ID=2 is mounted, the flow advances to step S5 to binarize the Y data and convert the print data corresponding to the remaining colors into quaternary data. If it is determined in step S3 that the head cartridge 1 indicated by ID=3 is mounted, the flow advances to step S6 to binarize the Y data and convert the print data corresponding to the remaining colors into quinary data. In step S7, print codes are generated on the basis of the print data obtained by conversion in one of steps S4, S5, and S6, and the codes are sent to the printer apparatus 200 through the interface 306.

Figure 15:
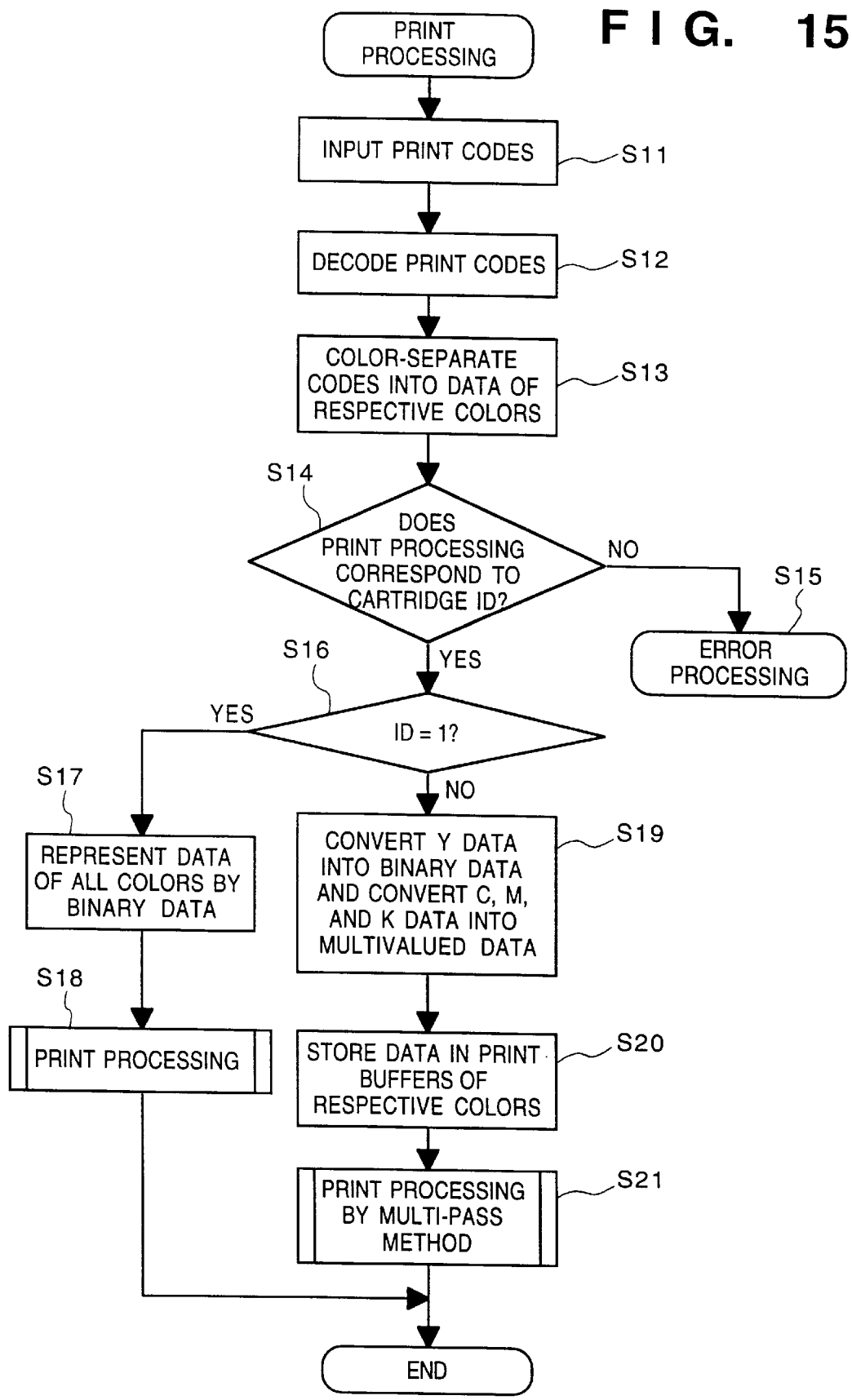
FIG. 15 is a flow chart showing the print processing in the ink-jet printer apparatus of the first embodiment.

FIG. 15 is a flow chart showing print processing in the printer apparatus 200 of the first embodiment. The control program for executing this processing is stored in the ROM 311.

In step S11, the print codes received from the host computer 100 and stored in the reception buffer are read out. In step S12, the readout print codes are decoded. The flow then advances to step S13 to convert the codes into print data corresponding the respective colors in accordance with the decoding result. Thereafter, the flow advances to step S14 to check on the basis of the received data whether a print operation can be performed by using the currently mounted head cartridge 1. If NO in step S14, the flow advances to step S15 to give an indication of an error on the operation unit 307 and terminate the process.

If YES in step S14, the flow advances to step S16 to check whether the head cartridge ID data is "1". If YES in step S16, the flow advances to step S17 to convert all the color data into binary print data and develop the data in the print buffers. In step S18, a general 1-pass print operation is performed.

If it is determined in step S16 that the head cartridge ID data is not "1", the flow advances to step S19 to convert only the Y data into binary data and convert the remaining color data into quaternary or quinary data. Note that this processing may be uniquely determined on the basis of the print codes or independently performed on the printer apparatus side on the basis of the ID data of the head cartridge mounted in the printer apparatus. Thereafter, the flow advances to step S20 to store the print data, which have been developed into patterns of the respective colors, in the print buffers in correspondence with the respective colors. The flow then advances to step S21 to print the multivalued data by the multi-pass method, as described above with reference to FIGS. 11A and 11B and 12A to 12C.

Figure 16:
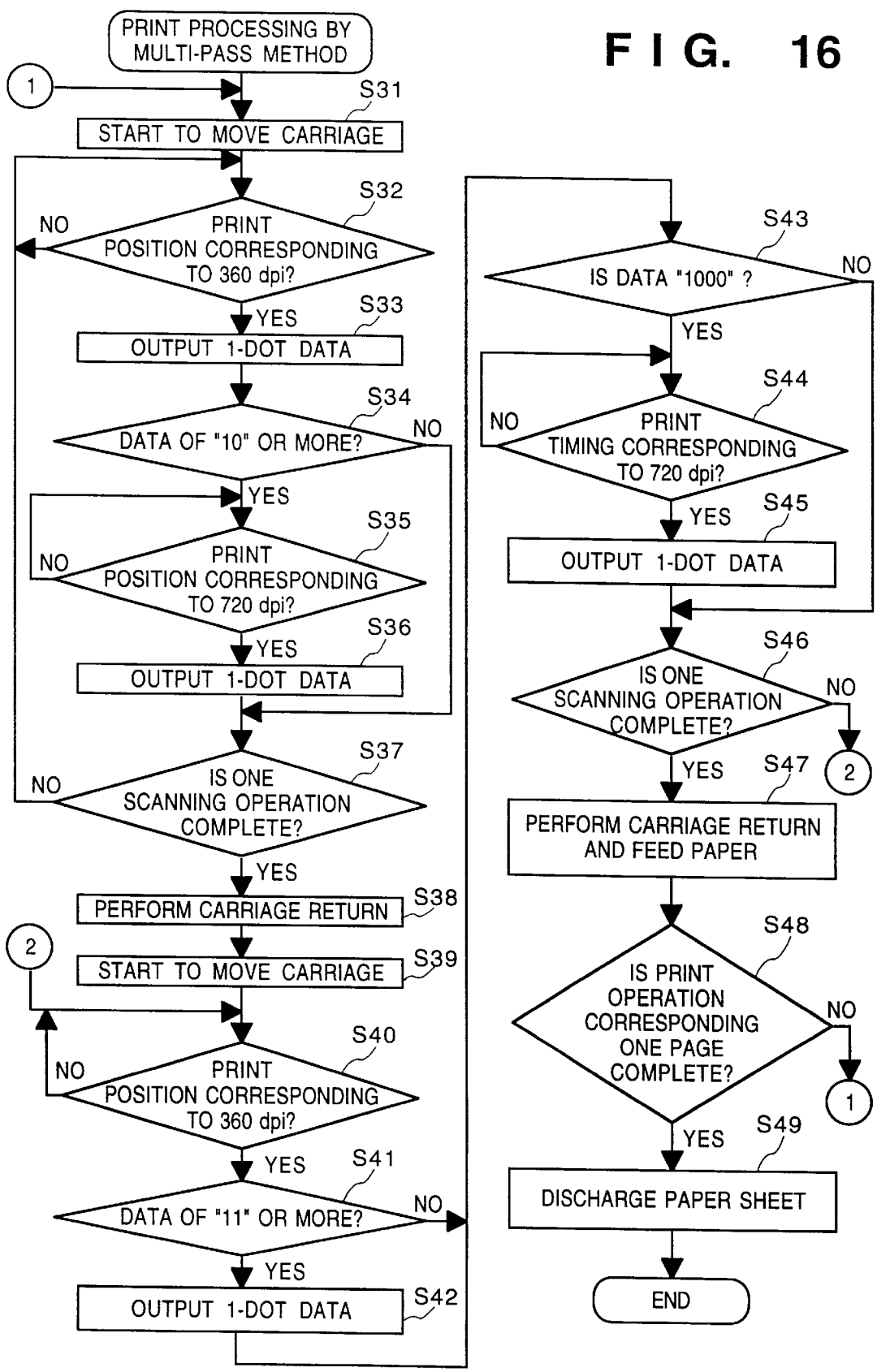
FIG. 16 is a flow chart showing the print processing based on the multi-pass method in the ink-jet printer apparatus of the first embodiment.

FIG. 16 is a flow chart showing print processing performed by such a multi-pass method (step S21).

In step S31, rotation of the carriage motor 6 is started. In step S32, the respective color print data to be printed next are read out from the print buffers corresponding to the respective colors, and it is checked whether the print timing at which a print operation is performed in a resolution of 360 dpi has come. If YES in step S32, the flow advances to step S33 to output the print data corresponding to the respective colors to the heads 1Y, 1M, 1C, and 1B through the head driver 302, thereby printing dots at the position denoted by reference numeral 700 in FIG. 11B (when the data is not "0" or "00"). The flow then advances to step S34 to check whether the multivalued data excluding the Yellow print data include data of "10" or more. If NO step S34, since only one dot is to be printed as in the case in FIG. 12A, the flow advances to step S37.

If it is determined in step S34 that the data include data of "10" or more, the flow advances to step S35 to check whether the timing at which the 720-dpi dot denoted by reference numeral 701 in FIG. 11B is printed has come. If YES in step S35, the flow advances to step S36 to output the print data to the heads 1M, 1C, and 1B of the corresponding colors and print an image. The flow then advances to step S37 to check whether the print processing corresponding to one scanning operation is complete. If NO in step S37, the flow returns to step S32 to execute the above process.

If YES in step S37, the flow advances to step S38 to perform a carriage return to return the head to the home position. The flow then advances to step S39 to rotate/drive the carriage motor 6 again in the forward direction. In step S40, as in step S32, it is checked whether the print timing at which a print operation is performed in a resolution of 360 dpi has come. If YES in step S40, the flow advances to step S41 to check whether the print data include data of "11" or more. If YES in step S41, the flow advances to step S42 to print the dot data at the corresponding position. The flow then advances to step S43 to check whether the print data include data of "1000" (the maximum quinary value). If YES in step S43, the flow advances to step S44 to check whether the print timing corresponding to 720 dpi has come. If YES in step S44, the flow advances to step S45 to print one dot at the corresponding position.

If it is determined in step S46 that the print operation corresponding to one scanning operation is complete, the flow advances to step S47 to execute a carriage return to return the carriage unit 2 to the home position, and drive the conveyance motor 305 so as to convey the print paper sheet by a distance corresponding to total width (print width) of the print elements of the head of each color. With this operation, an image corresponding to the print width is printed by the printhead of each color. The flow then advances to step S48 to check whether a print operation corresponding to one page is complete. If NO in step S48, the flow returns to step S1 to generate print data corresponding to an image to be printed by the next scanning operation and store the data in the print buffers of the respective colors. When the image print operation corresponding to one page is complete in this manner, the flow advances to step S49 to discharge the resultant print paper sheet and terminate the process.

[Second Embodiment]

In the first embodiment described above, as shown in FIG. 17, when a print operation is to be performed, the type of head cartridge mounted in a printer apparatus 200 is determined, and the print mode corresponding to the type of head cartridge is automatically set by the driver of the host computer, thereby controlling the operation upon interlocking the color processing performed by the driver with the processing performed by the controller.

In contrast to this, in the second embodiment, the user is allowed to arbitrarily set a print mode on the display screen of a host computer 100 so as to reliably select a print mode in accordance with a user's application purpose.

Figure 17:
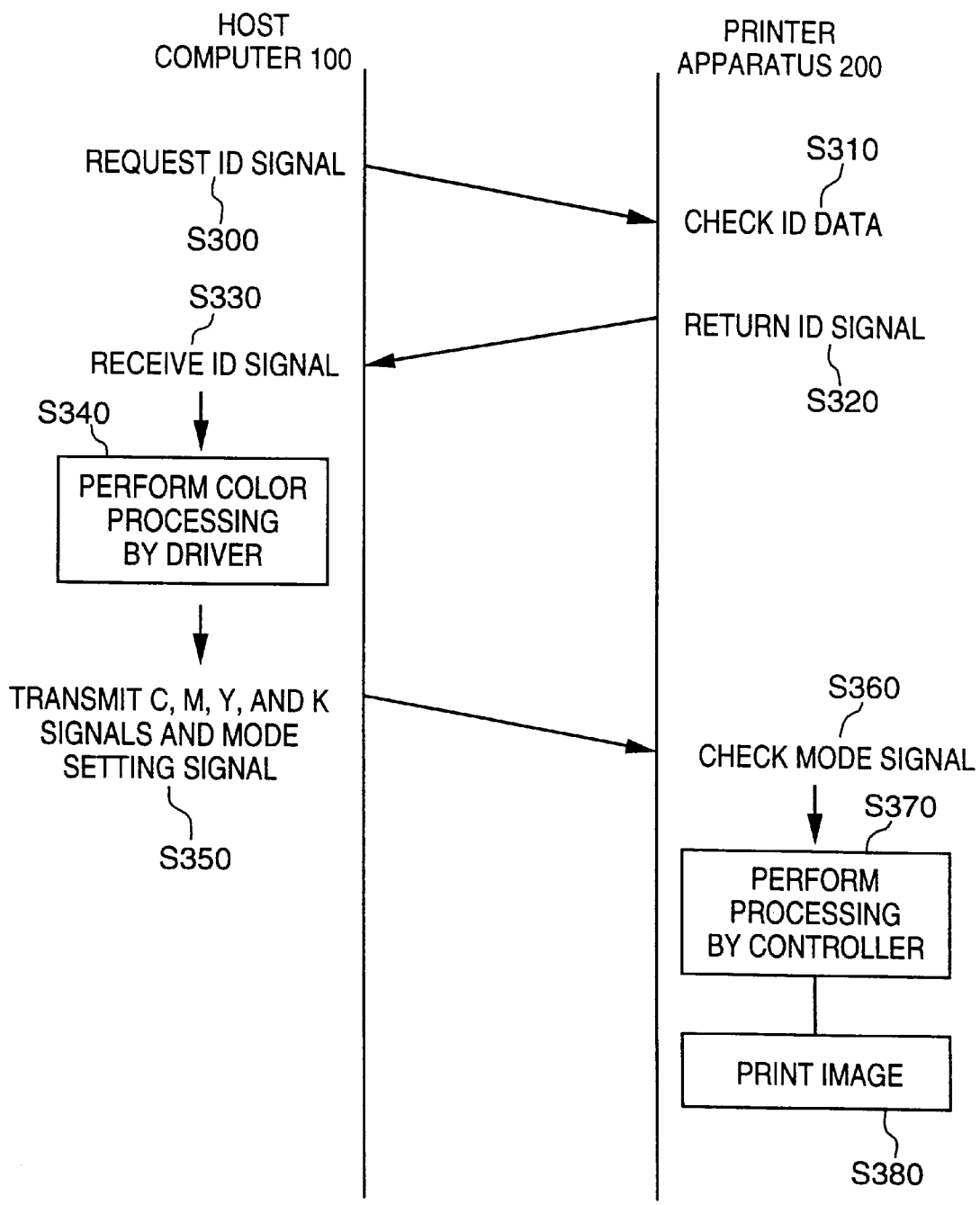
FIG. 17 is a view showing how data are exchanged between the host computer and the printer apparatus in the first embodiment.

The operation in FIG. 17 will be briefly described below. The host computer 100 inquires about the type of cartridge mounted in the printer apparatus 200 (step S300). With this operation, the printer apparatus 200 discriminates the type of mounted cartridge by reading the ID data of the cartridge (step S310). The printer apparatus 200 then returns the ID data to the host computer 100 (step S320). Upon reception of the ID data (step S330), the host computer 100 causes the driver to perform color processing for the image data in accordance with the color of the cartridge (step S340). The host computer 100 transmits the resultant color signals as C, M, Y, and K signals and a mode signal to the printer apparatus 200 (step S350). The printer apparatus 200 receives these signals and causes the controller to perform image development (step S370), and prints an image (step S380).

Note that since the arrangements of the host computer and the printer apparatus of the second embodiment are the same as those of the first embodiment, a description thereof will be omitted.

Figure 18:
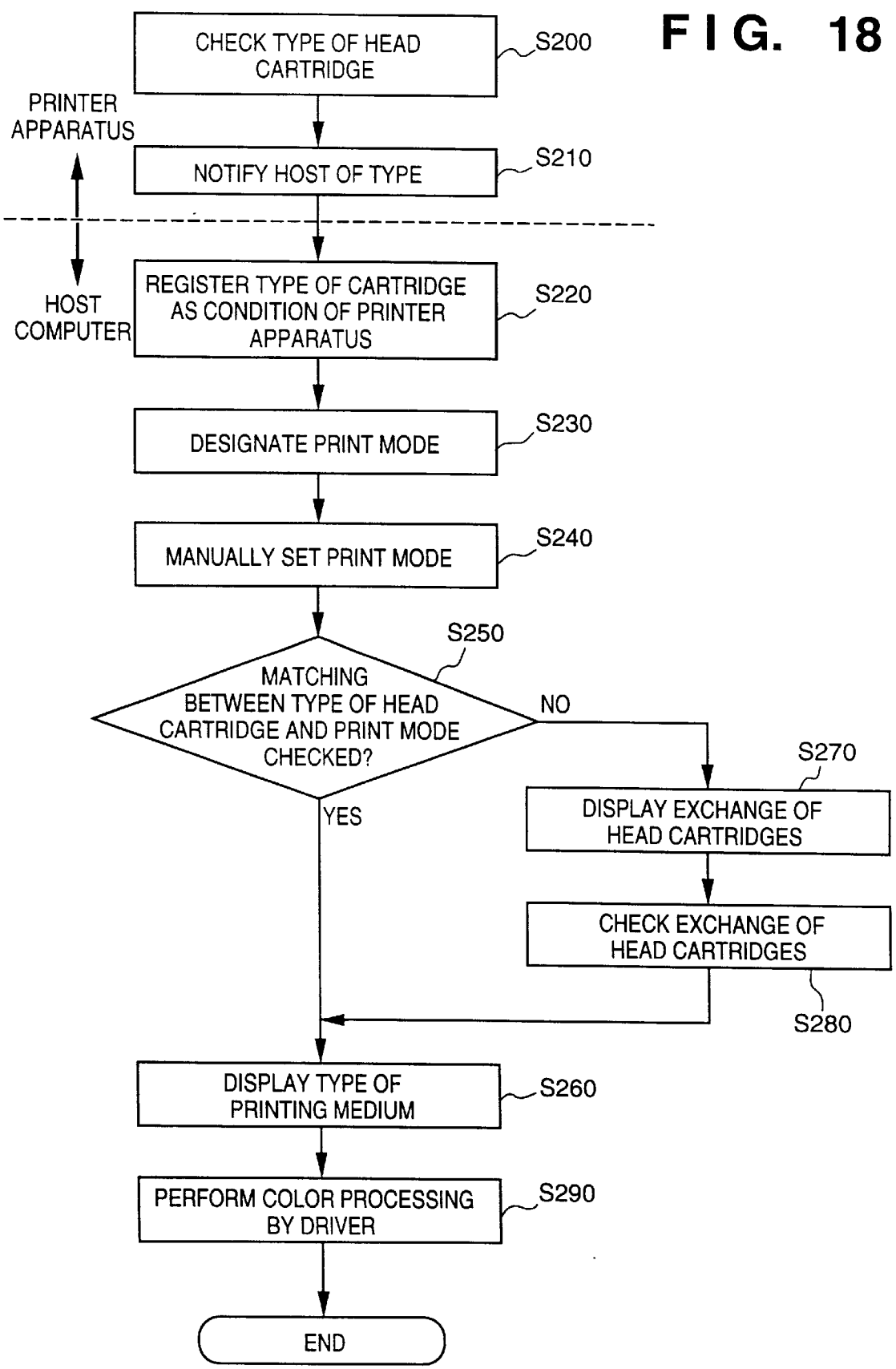
FIG. 18 is a flow chart showing the print mode setting processing in the second embodiment of the present invention.

FIG. 18 is a flow chart showing print mode setting in the second embodiment.

When the printer apparatus 200 is powered on, and a head cartridge 1 is mounted, the type of the head cartridge 1 is checked on the basis of the ID data of the head cartridge as in the first embodiment (step S200). An ID signal representing the check result in step S200 is sent to the host computer 100 (step S210). The processing in steps S200 and S210 is performed by the printer apparatus 200. The following processing is performed by the host computer 100.

The type of head cartridge currently mounted in the printer apparatus 200 is registered as a condition of the printer apparatus, together with the type of the printer apparatus 200 and the like, on the basis of the ID signal received from the printer apparatus 200 (step S220). A print mode is then designated by the user (step S230). The user manually sets the print mode corresponding to his/her application purpose on the basis of the user interface (UI) displayed on the display screen of the host computer 100, like the one shown in FIG. 19 (step S240).

In the second embodiment, the print modes correspond to the types of head cartridges 1, as shown in FIG. 9. The normal mode, the pictorial mode 1, the pictorial mode 2, and the monochrome mode correspond to ID1, ID2, ID3, and ID0, respectively.

As described in the first embodiment, each head cartridge 1 corresponds to one of the print modes. Therefore, whether the head cartridge 1 corresponding to the set print mode is mounted is determined by checking the type of head cartridge 1 which is registered in step S220 (step S250).

If the head cartridge 1 corresponding to the set print mode is mounted, the host computer 100 instructs the user to set a printing medium corresponding to the print mode. In the second embodiment, as shown in FIG. 9, the normal mode corresponds to plain paper, coated paper, and pictorial paper. If, therefore, the normal mode is set, the host computer 100 instructs the user, for example, in the manner shown in FIG. 20.

If the head cartridge 1 corresponding to the set print mode is not mounted, the host computer 100 instructs the user to replace the cartridge with the head cartridge 1 corresponding to the print mode (step S270). Assume that the pictorial mode 1 is set even though the currently head cartridge 1 corresponds to the normal mode (ID=1). In this case, as shown in FIG. 21, the host computer 100 instructs the user to replace the head cartridge 1 with the proper type of head cartridge (indicated by ID=2). By repeating steps S200, S210, S220, and S250, the host computer 100 checks whether the head cartridge 1 is replaced with the head cartridge 1 corresponding to the print mode (step S280). When the head cartridge 1 and the printing medium corresponding to the set print mode are set in this manner, the driver starts to perform the color processing shown in FIG. 8 (step S290). Thereafter, the host computer 100 performs the same processing as that in the first embodiment described above.

As described above, according to the second embodiment, an image can be reliably printed in the print mode corresponding to the user's application purpose, and an erroneous image print operation caused by a print mode setting error or the like can be prevented.

Note that if the normal or monochrome mode is set, since the type of a printing media to be used are not limited, the processing in step S206 may be omitted. In this case, since the number of times warning display is performed can be decreased, a user-friendlier UI can be provided.

Figure 22:
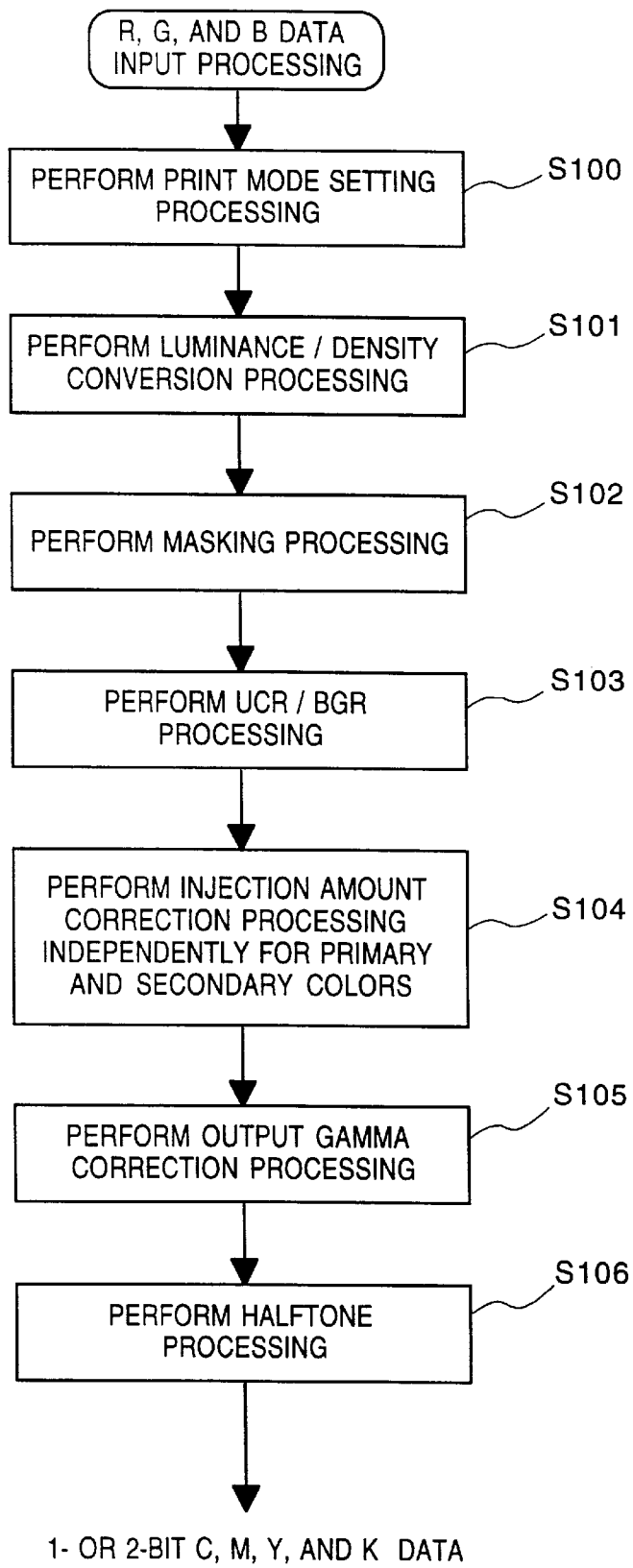
FIG. 22 is a flow chart showing an example of the image processing performed by an image processing module in the printer driver in the second embodiment.

FIG. 22 is a flow chart showing an example of the image processing performed by the image processing module in a printer driver 103, which corresponds to FIG. 8. The processes common to the flow charts in FIGS. 8 and 22 are denoted by the same reference symbols, and a description thereof will be omitted. In the processing in FIG. 22, a print mode is set through the above UI (step S100), and image processing is performed in accordance with the set print mode.

Note that when the host computer 100 is connected to the printer apparatus 200 through a one-way communication line, the driver of the host computer 100 sets a print mode using a predetermined head cartridge in accordance with an instruction manually input by the user. As in the first embodiment, the controller of the printer apparatus 200 automatically discriminates the type of the head cartridge 1, and automatically sets a print mode on the basis of the discriminated type of the head cartridge 1. The controller then receives image data indicating the print mode manually designated by the user from the driver through the one-way communication line. If the print mode indicated by the received data coincides with the print mode automatically set by the controller, print processing is executed. If these modes do not coincide with each other, the occurrence of an error is displayed on an operation unit 307 of the printer apparatus to notify the user of the error. With this display, the user checks the type of printhead mounted in the printer apparatus 200 and sets a print mode again in accordace with the type of printhead. This operation can prevent the printer apparatus from printing an image in a mismatching print mode. The number of times of misprinting can be reduced.

According to the above description, in this embodiment, the processing in the host computer 100 and the processing in the printer apparatus 200 are separately performed. However, the present invention is not limited to this. These functions may be implemented in one apparatus or unit.

In addition, a print element separation means separates achromatic color components to express the high-lightness portions of the achromatic color components by process black consisting of a mixture of yellow, magenta, and cyan, and express the low-lightness portions of the achromatic color components by black. With this operation, an achromatic color component print can obtain gradation by means of the process black and black ink. Since the high-lightness portions are expressed by the process black, an image with little graininess can be obtained. That is, it suffices if the graininess of black dots on a transition portion from the process black to black is reduced. Even if an ink having a higher dye density than magenta and cyan inks is used, the graininess and gradation characteristics do not deteriorate.

In this embodiment, even if a dilute ink is used for an image with a low gradation level, e.g., a document or bar chart image, the gradation characteristics do not improve. When a dilute ink is used to print a high-density image, since three ink droplets are injected onto a printing medium, the ink overflows depending on the type of printing medium. This printer apparatus therefore includes a means of allowing the user to select an ink used by the print elements in accordance with the image and the type of printing medium to be used.

Figure 23:
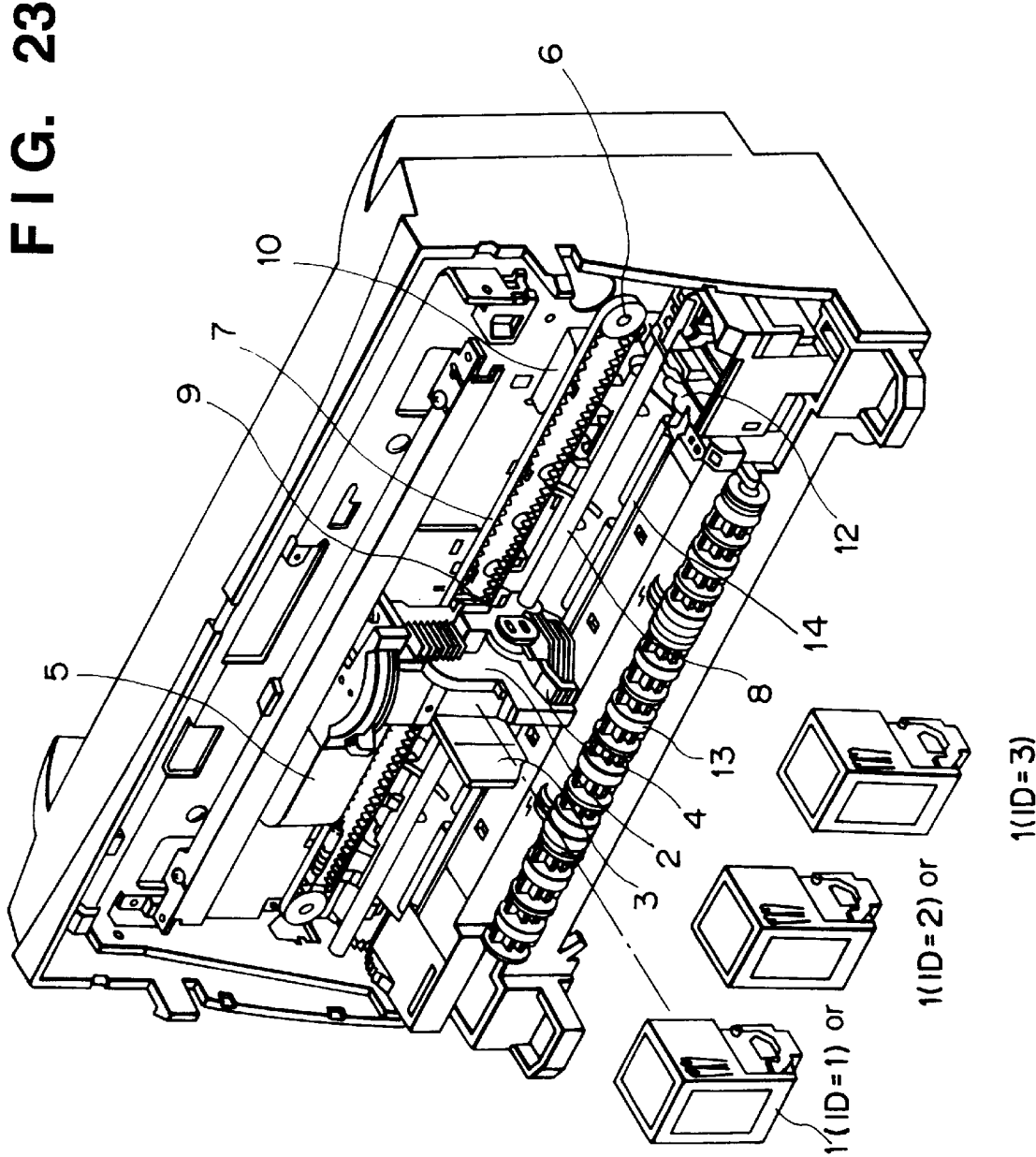
FIG. 23 is a perspective view showing printhead cartridges containing different types of inks and the printer apparatus main body according to the second embodiment.
Figure 24:
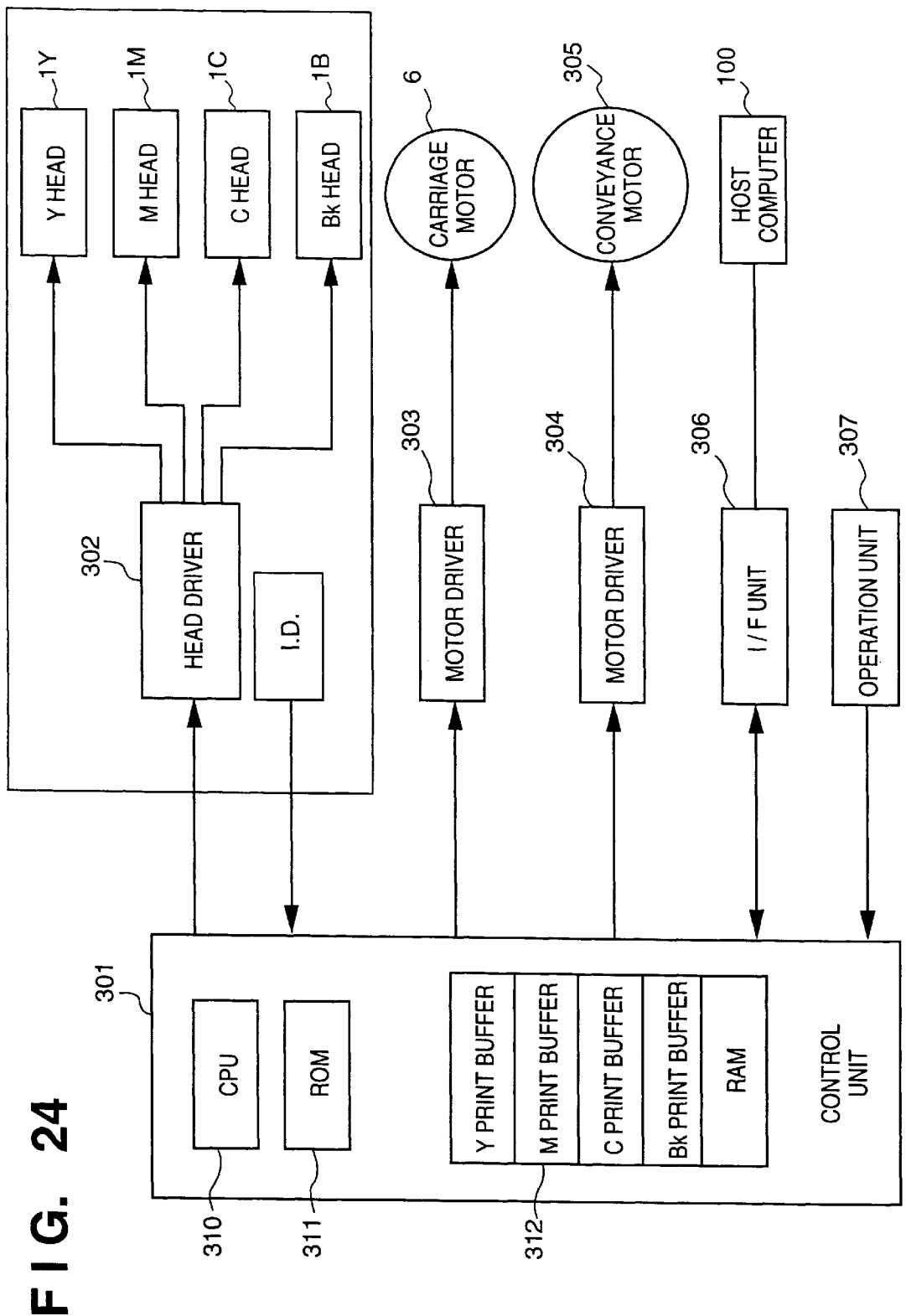
FIG. 24 is a block diagram showing the arrangement of a printer apparatus of the second embodiment.

FIG. 23 shows head cartridges containing different inks to be used by the print elements and the printer apparatus main body. FIG. 24 is a block diagram of the printer apparatus. The same reference numerals in FIGS. 23 and 24 denote the same parts as in FIGS. 2 and 13, and a description thereof will be omitted.

ID data which can recognized by the printer apparatus are assigned to these head cartridges. The dye densities of the inks in the head cartridge indicated by ID=1 are: 2.5% in the yellow ink; 3.0% in the magenta ink; 2.7% in the cyan ink; and 2.6% in the black ink. The dye densities of the inks in the head cartridge indicated by ID=2 are: 2.5% in the yellow ink; 1.0% in the magenta ink; 0.9% in the cyan ink; and 1.3% in the black ink. The dye densities of the inks in the head cartridge indicated by ID=3 are: 2.5% in the yellow ink; 0.8% in the magenta ink; 0.7% in the cyan ink; and 0.9% in the black ink.

In the second embodiment, with the use of the inks corresponding to ID=1, one yellow pixel can be properly expressed in binary gradation; one magenta pixel, in binary gradation; one cyan pixel, in binary gradation; and one black pixel, in binary gradation. With the use of the inks corresponding to ID=2, one yellow pixel can be properly expressed in binary gradation; one magenta pixel, in quaternary gradation; one cyan pixel, in quaternary gradation; and one black pixel, in binary gradation. With the use of the inks corresponding to ID=3, one yellow pixel can be properly expressed in binary gradation; one magenta pixel, in quinary gradation; one cyan pixel, in quinary gradation; and one black pixel, in ternary gradation.

With the inks corresponding to ID=1, one-pixel yellow print data is handled as one bit; one-pixel magenta print data, as one bit; one-pixel cyan print data, as one bit; and one-pixel black print data, as one bit. With the inks corresponding to ID=2, one-pixel yellow print data is handled as one bit; one-pixel magenta print data, as two bits; one-pixel cyan print data, as two bits; and one-pixel black print data, as two bits. With the inks corresponding to ID=3, one-pixel yellow print data is handled as one bit; one-pixel magenta print data, as three bits; one-pixel cyan print data, as three bits; and one-pixel black print data, as two bits.

In the printer apparatus, the configurations of the print buffers are changed in accordance with the ID data of the head cartridge. When the head cartridge indicated by ID=1 is mounted, all the print buffers are made to have 1-bit configurations. When the head cartridge indicated by ID=2 is mounted, the print buffer for yellow data is made to have a 1-bit configuration, and the print buffers for the remaining colors are made to have 2-bit configurations. When the head cartridge indicated by ID=3 is mounted, the print buffer for yellow data is made to have a 1-bit configuration, the print buffers for magenta and cyan data are made to have 3-bit configurations, and the print buffer for black data is made to have a 2-bit configuration.

As described above, since the user selects a head cartridge in accordance with the image to be printed and the type of printing medium, the gradation level of the image to be printed can be changed. In this case as well, an increase in the capacity of each print buffer can be suppressed by suppressing the gradation of a high-lightness yellow image.

[Third Embodiment]

The third embodiment of the present invention will be described next. In the ink-jet printer apparatus of this embodiment, when an image with the highest quality is to be printed, the image is formed by using the divisional printing method described below. In this divisional printing method, image data is generated by a thinning process using a plurality of mask patterns (to be referred to as masks hereinafter), and the printhead is scanned a plurality of numbers of times using the image data, thereby printing an image.

In this divisional printing method, since a print operation is performed by using different portions of the nozzle array of a head cartridge 1 in a plurality of scanning operations, image irregularity based on the directions in which inks are discharged from the head cartridge 1, the amounts of inks discharged from the respective nozzles, and the like can be reduced.

Figure 26A:
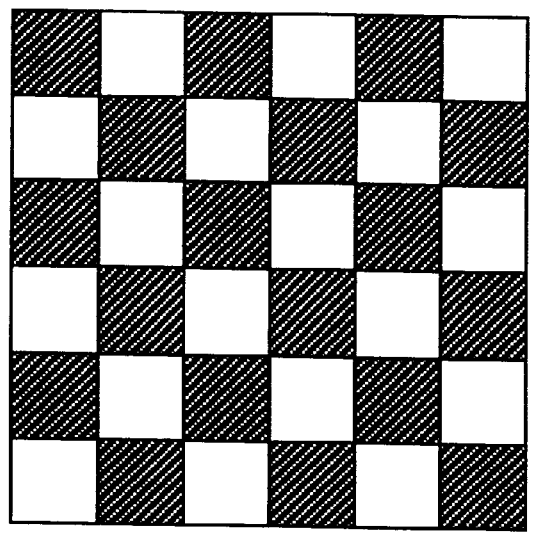
FIGS. 26A and 26B are views showing examples of mask data in the third embodiment of the present invention.
Figure 26B:
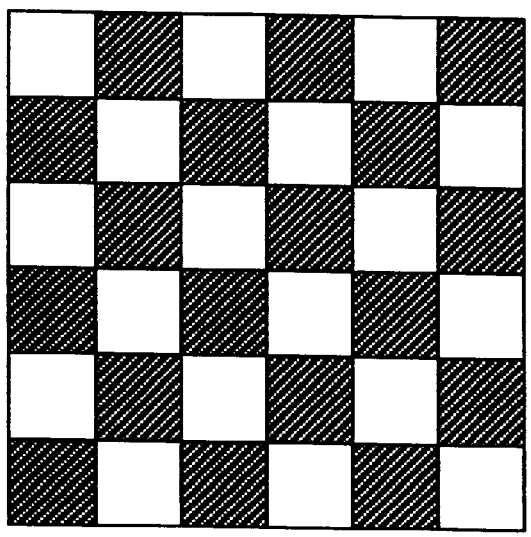

FIGS. 26A and 26B show examples of the above masks. For example, each of these masks is used to thin out image data by 50% to print an image by performing a scanning operation twice. The mask patterns shown in FIGS. 26A and 26B have complementary data configurations.

Figure 27A:
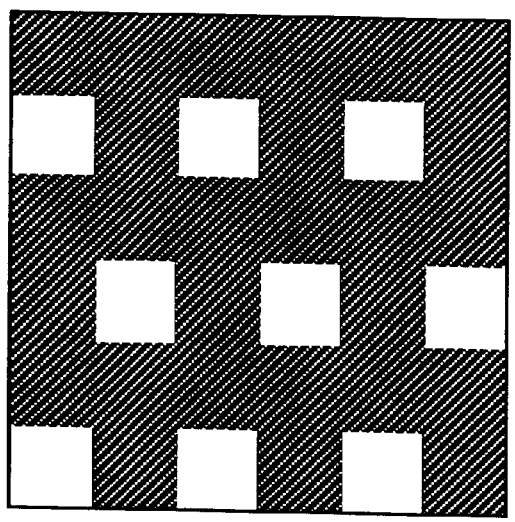
FIGS. 27A and 27B are views showing other examples of the mask data in the third embodiment.
Figure 27B:
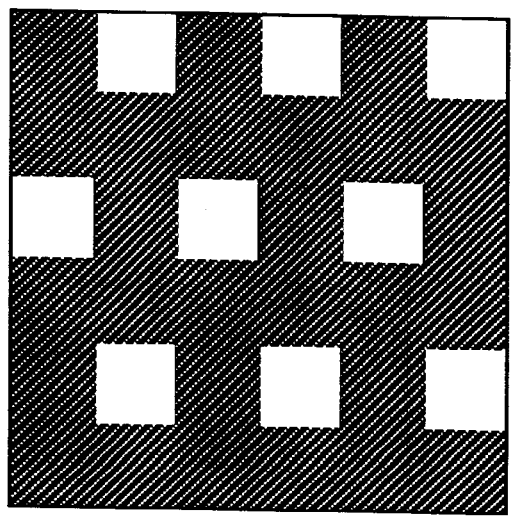

Assume that image data is thinned out by each mask data by a ratio below 50% (i.e., the number of dots to be actually printed is increased), as shown in FIGS. 27A and 27B, and an image is printed in the same manner as described above. In this case, as is apparent, many droplets of ink can be injected onto a printing medium. When an image is to be printed by using a thin ink, a larger amount of ink must be injected onto a printing medium than when a thick ink is used. For this reason, the mask data in the above divisional printing method are changed to change the amount of ink injected onto the printing medium depending on whether a thick or thin ink is used.

When inks having different densities are to be used in combination in accordance with the color of an image, the masks used in the above divisional printing method are changed for each color to control the amount of ink injected, thereby injecting an ink onto a printing medium in an amount required for each color. With this control, an image with a predetermined density can be printed.

In the third embodiment, when an image is to be printed by using a thin ink, a scanning operation is performed the same number of times as in a print operation using a thick ink. In this case, as described above, the divisional printing method is used. More specifically, the masks for generating thinned image data are changed to increase the amount of ink injected onto a printing medium per scanning operation. With this operation, a thin ink can be injected onto the printing medium in an amount required to form an image without changing the number of times of scanning. In this case as well, the driving frequency of the head cartridge 1 is set to prevent the ink from overflowing the printing medium.

This printing method has the following merits. For example, in a print operation using a thin ink, when the amount of ink injected per unit time is to be suppressed to a predetermined amount or less, the number of times of scanning in the divisional printing method must be increased to obtain a predetermined print density. As a result, the print time is prolonged on a unit-time (required for one scanning operation) basis. In contrast to this, according to the method of the third embodiment, an image can be printed by the same number of times of scanning as in a print operation using a thick ink, and the amount of ink injected onto a printing medium member per unit time can be set by setting the driving frequency of the printhead to a predetermined driving frequency. This method can therefore prevent an ink from overflowing the printing medium and print an image at the maximum speed.

If a printing medium has a sufficient ink absorbing capacity, a necessary amount of thin ink can be injected onto the printing medium to print an image. That is, in a print operation using a thin ink, an image can be printed by performing a scanning operation the same number of times with the same driving frequency of the printhead as in a print operation using a thick ink.

In addition, in print control using a thick ink, an optimal driving frequency is set to allow the printhead to stably discharge the ink in consideration of a combination of the thick ink, the printhead, and the like. Note that a thin ink contains a color developing material such as a dye or pigment in a smaller amount than a thick ink, or the amount of an organic material to be added to disperse such a color developing material or delay the solidification of the ink can be reduced. In general, therefore, a thin ink has a lower viscosity, and the time interval between the instant at which the ink is discharged from the printhead and the instant at which the next ink is supplied and can be discharged is shorter. For this reason, the driving frequency of the printhead in a print operation using a thin ink can be set to be higher than that in a print operation using a thick ink. That is, an image can be printed at a high speed in use of a thin ink.

Furthermore, in the third embodiment, when an image is to be printed by using a thin ink, the printer apparatus or software (e.g., a driver 103 used by an OS 101 of a host computer 100 described above) capable of controlling the printer apparatus identifies/detects the type of a printing medium (print paper or the like). Alternatively, the type of printing medium to be used for the print operation is identified upon designation of a printing medium by the user. Thereafter, when a print operation is performed by the divisional printing method, predetermined masks and a predetermined driving frequency are selected in accordance with the resultant information.

In general, printing medium greatly differs in ink absorbing capacity. However, with the above functions corresponding to the respective printing medium, a print operation can be performed with the ink injection amount corresponding to each type of printing medium at the maximum speed.

The third embodiment will be described in detail below.

Figure 28:
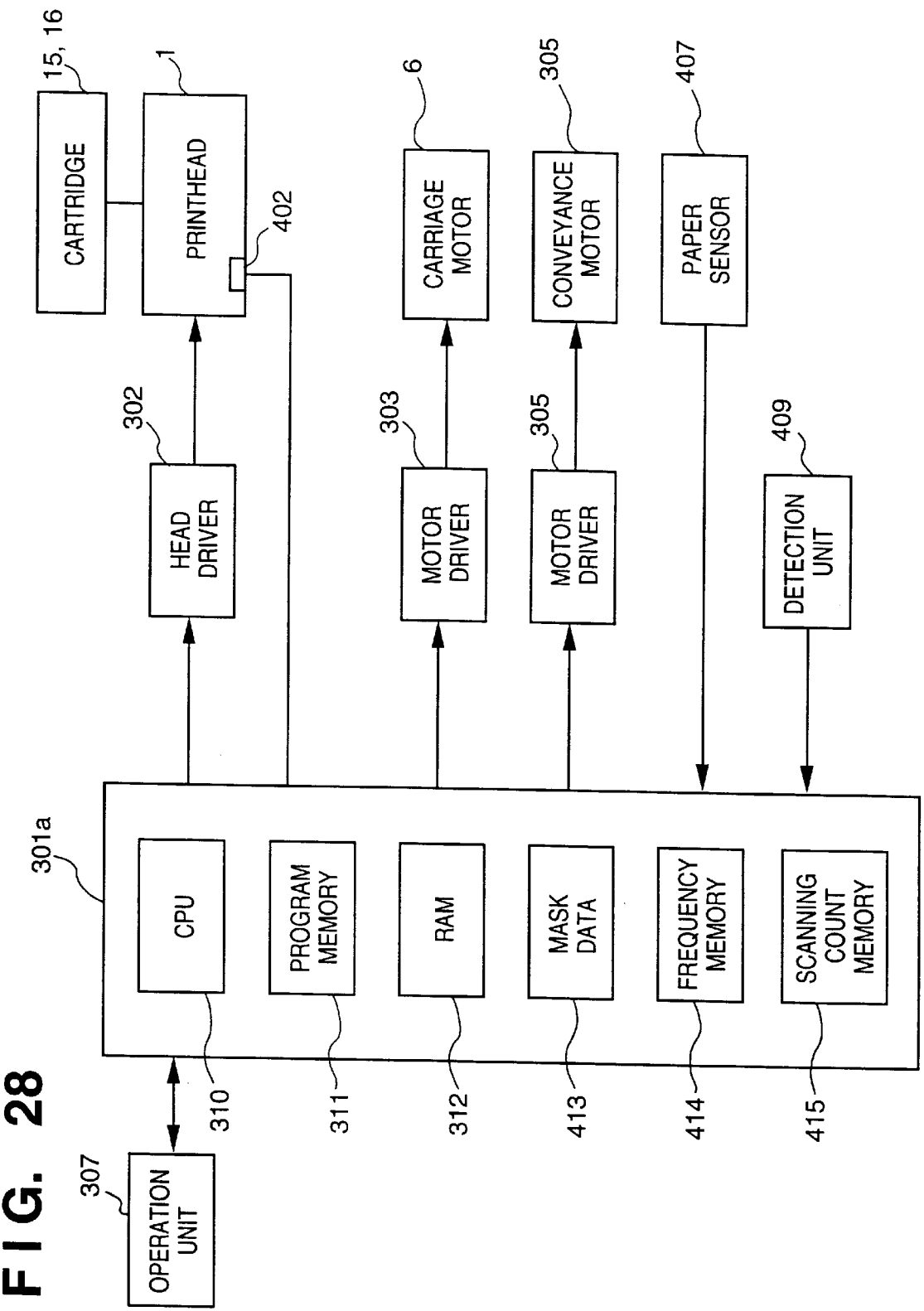
FIG. 28 is a block diagram showing the arrangement of an ink-jet printer apparatus of the third embodiment of the present invention.

FIG. 28 is a block diagram showing the arrangement of an ink-jet printer apparatus according to the third embodiment of the present invention.

Referring to FIG. 28, reference numeral 301a denotes a control unit for controlling the overall printer apparatus. The control unit 301a includes a CPU 310 such as a microcomputer, a program memory 311 storing control programs executed by the CPU 310 and various data, and a RAM 312 which is used as a work area for temporarily storing various data when processing is executed by the CPU 310. Reference numeral 413 denotes a mask memory storing, for example, the plurality of mask data described above; and 414, a frequency memory storing pieces of driving frequency information for the printheads in correspondence with the types of inks to be used, i.e., a thick ink and a thin ink, and the types of printing media.

A head driver 302 drives the head cartridge 1 in accordance with print data to discharge an ink so as to print an image. This head cartridge 1 may include printheads for discharging four different inks, as shown in FIGS. 13 and 24. Reference numeral 402 denotes a circuit for identifying the type of ink contained in the head cartridge 1. For example, the circuit 402 has the same arrangement as that shown in FIG. 5.

Reference numeral 407 denotes a paper sensor for identifying the type of a printing medium set in the printer apparatus. Instead of using the paper sensor 407, an operation unit 307 may be used to designate the type of ink contained in the head cartridge 1 or the type of a printing medium (paper) set in the printer apparatus. Reference numeral 409 denotes a detection unit including a temperature sensor, a humidity sensor, and the like which are used to detect information about the environment in which the printer apparatus is placed.

Figure 29:
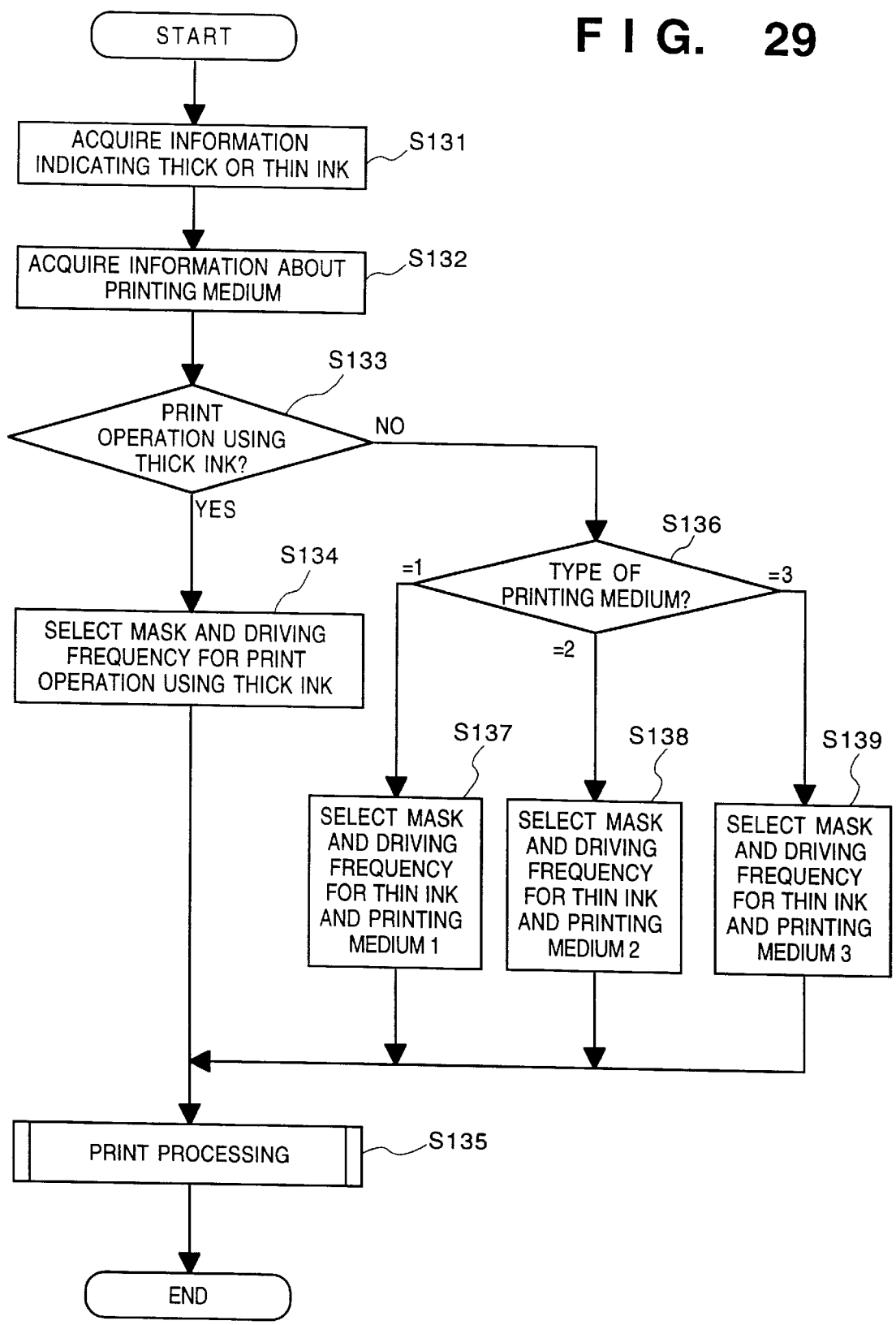
FIG. 29 is a flow chart for explaining print control performed by the ink-jet printer apparatus of the third embodiment of the present invention.

FIG. 29 is a flow chart showing print processing in the ink-jet printer apparatus of the third embodiment. The control program for executing this processing is stored in the program memory 311. The processing is started when, for example, the printer apparatus receives print data corresponding to one scanning operation or one page from the host computer, and is ready for a print operation which is performed by scanning the head cartridge 1 once. Assume that the processing is started when one-page print data is received.

In step S131, the control unit acquires information indicating that the ink in the head cartridge 1 is a thick or thin ink. As described with reference to FIGS. 5 and 6, in this step, the control unit may acquire information indicating connection of specific lines in the circuit 402, or may receive designation information input from the operation unit 307. The flow then advances to step S132 to acquire information about the material of the printing medium (print member) set in the printer apparatus. In this step, the control unit may acquire information by using the paper sensor 407 or acquire designation information input from the operation unit 307.

The flow advances to step S133 to identify the type of ink in the head cartridge 1 on the basis of the information acquired in step S132. If it is determined that the ink is a thick ink, the flow advances to step S134 to select thick ink mask data from the mask memory 413, and select the driving frequency information for the head cartridge 1 which is suited for a thick ink from the frequency memory 414. The flow then advances to step S135 to perform a print operation corresponding to one page by the divisional printing method. The processing in step S135 will be described later with reference to the flow chart of FIG. 30.

If it is determined in step S133 that a thin ink is contained in the head cartridge 1, the flow advances to step S136 to determine the type of set printing medium on the basis of the printing medium information acquired in step S132. The type of printing medium (e.g., 1: plain paper, 2: ink-jet print paper, 3: resin film) is determined in step S136, and the flow advances to one of steps S137 to S139 in accordance with the determined type to select mask data and a driving frequency which correspond to the determined type. The flow then advances to step S135 to perform a print operation by the divisional printing method.

Figure 30:
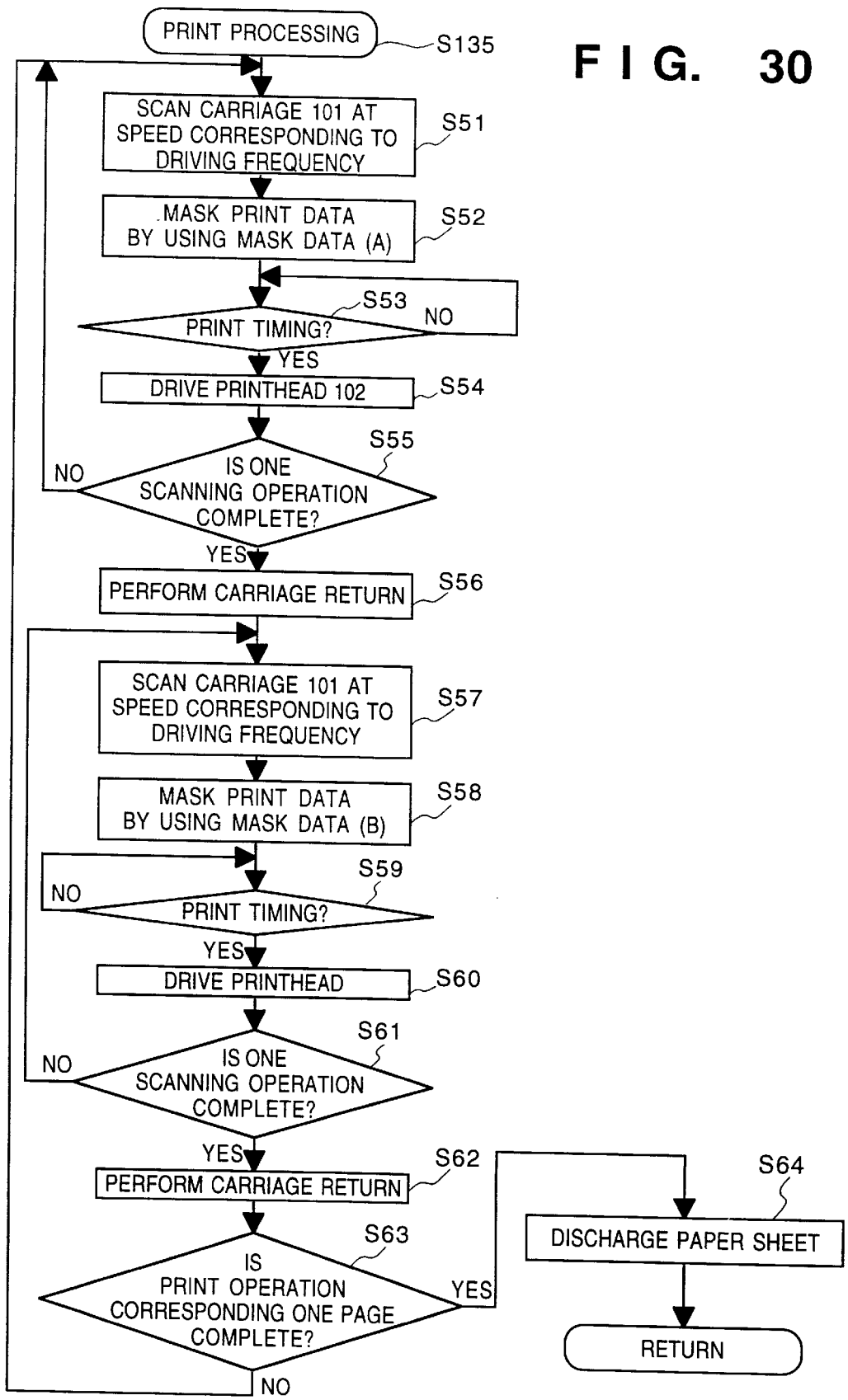
FIG. 30 is a flow chart showing print processing in step S135 in FIG. 29.

FIG. 30 is a flow chart showing the print processing in step S135 in the flow chart of FIG. 29. Note that this flow chart corresponds to the processing of print data of one color of print data of a plurality of colors.

At the start of this processing, a carriage motor 6 starts to rotate. In step S51, the driving frequency of the carriage motor 6 is determined in accordance with the driving frequency selected in one of steps S134, S137, S138, and S139, and the carriage motor 6 is rotated/driven at the determined driving frequency. With this operation, the carriage unit 2 is conveyed/driven at a speed corresponding to the driving frequency. In step S52, 1-column print data is masked by one of the mask data, e.g., the mask data shown in FIG. 27A, which is selected in one of steps S134, S137, S138, and S139. When the head cartridge 1 reaches the print position, and the print timing has come, the flow advances from step S53 to step S54 to output the print data to the head driver 302 so as to drive the head cartridge 1. In step S55, it is checked whether the print operation corresponding to one scanning operation is complete. If NO in step S55, the flow returns to step S51 to repeatedly execute the above processing.

If YES in step S55, the flow advances to step S56 to return the head cartridge 1 to the print start position. The carriage unit 2 is conveyed/driven again at a speed corresponding to the driving frequency. In this case, the print data is masked by using one of the above mask data, e.g., the mask data in FIG. 27B. Thereafter, in steps S59 to S61, a print operation corresponding to one scanning operation is performed in the same manner as in steps S53 to S55 described above. When the print operation corresponding to one scanning operation is complete, the flow advances to step S62 to perform a carriage return and feed the paper sheet by a print width corresponding to one scanning operation. The flow then advances to step S63. In step S63, it is checked whether print processing corresponding to one page is complete. If NO in step S63, the flow returns to step S51 to execute the above processing. If YES in step S63, the flow advances to step S64 to discharge the printed printing medium.

As described above, according to the third embodiment, a print operation using a thin ink can also be performed at a high speed by controlling the amount of ink injected in accordance with the type of ink and the type of printing medium which are used for the print operation.

[Fourth Embodiment]

The third embodiment described above includes the means of identifying the head cartridge 1 having an ink tank containing a relatively thick ink (which is mounted when a print operation using a thick ink is to be performed) or the head cartridge 1 having an ink tank containing at least a thin ink of one color (which is mounted when a print operation using a thin ink is to be performed), and the means of identifying the type of printing medium used for a print operation. In this arrangement, when a print operation is to be performed by the divisional printing method in the above manner, the operation is performed in either the mode of printing an image using a thin ink by performing a scanning operation the same number of times as in a print operation using a thick ink, and the mode of printing an image by performing a scanning operation a larger number of times. When a printing medium with a high ink absorbing rate is to be used, an image can be printed upon increasing the amount of ink discharged per unit time and decreasing the number of times of scanning. When a printing medium with a low ink absorbing rate is to be used, an image can be printed upon decreasing the amount of ink discharged per unit time and increasing the number of times of scanning.

That is, in the third embodiment, an image is printed by performing a scanning operation the same number of times regardless of the type of ink used, i.e., whether a thin or thick ink is used. However, printing medium varies in ink absorbing capacity. If, therefore, a print operation is performed upon decreasing the number of times of scanning (increasing the amount of ink discharged per unit time), an ink may overflow a printing medium even though the driving frequency of the printhead is decreased to a certain extent. In the fourth embodiment, therefore, if the use of a printing medium with such a low permeability is detected, the amount of ink discharged per unit time is decreased, and the number of times of scanning for printing an image is increased.

With this control, more types of printing medium can be used than in the third embodiment described above. In addition, even in a print operation using a thin ink, no overflow of the ink occurs, and the print operation can be performed at the maximum speed.

The arrangement of the ink-jet printer apparatus of the fourth embodiment is almost the same as that of the embodiment described above, but differs therefrom in that a control unit 301a includes a scanning count memory 415 (FIG. 28) storing the number of times of scanning.

Figure 31:
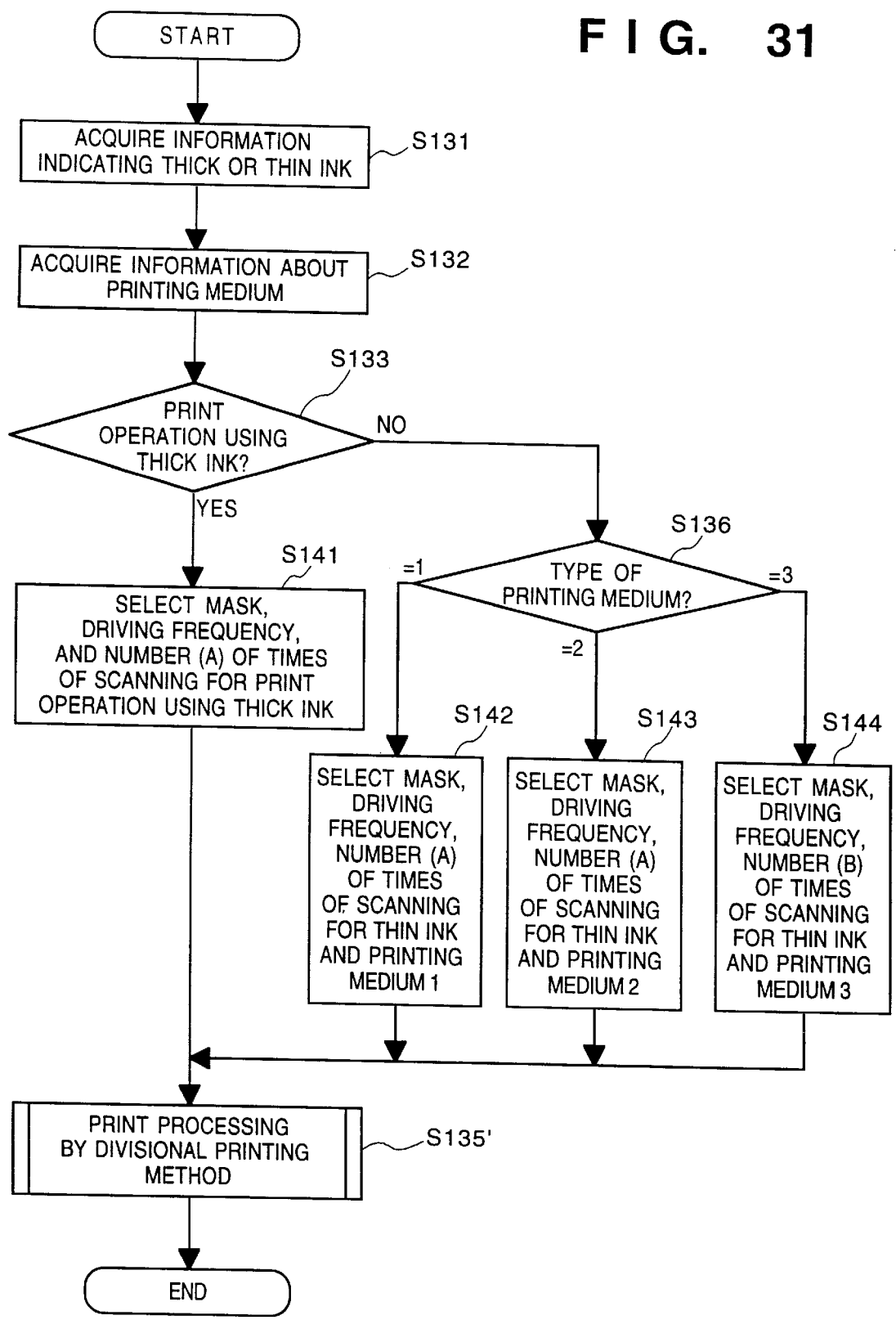
FIG. 31 is a flow chart for explaining print control performed by an ink-jet printer apparatus according to the fourth embodiment of the present invention.

FIG. 31 is a flow chart showing the processing performed by the ink-jet printer apparatus of the fourth embodiment. The control program for executing this processing is stored in a program memory 311.

The same reference symbols in FIG. 31 denote the same steps in FIG. 29 in the third embodiment described above, and a description thereof will be omitted.

If the head cartridge 1 contains a thick ink, the flow advances to step S141 to select thick ink mask data from a mask data storage unit 413, select driving frequency information suited for the thick ink from a frequency memory 414, and obtain the number (A) of times of scanning which corresponds to the thick ink from a scanning count memory 415. The flow then advances to step S135' to perform a print operation corresponding to one page by the divisional printing method. The processing in step S135' is the same as in the flow chart of FIG. 30 except for the following point. After it is determined in step S61 that a print operation corresponding to one scanning operation is complete, it is checked whether a scanning operation is performed the number of times of scanning which is acquired in step S141. If a given scanning operation is not complete, the flow returns to step S51 to start a print operation corresponding to the scanning operation.

If it is determined in step S133 that a thin ink is contained in the head cartridge 1, the flow advances to step S136 to check the type of printing medium mounted on the basis of the printing medium information acquired in step S132. In this step, the type of printing medium (e.g., 1: plain paper, 2: ink-jet print paper, 3: resin film) is determined, the flow then advances to one of steps S142 to S144 in accordance with the determined type to select mask data, a driving frequency, and the number of times of scanning. In this case, if the printing medium is determined as printing medium 1 or 2, the number of times of scanning is "A", which is the same as in the above print operation using the thick ink. If the printing medium is determined as printing medium 3, the number of times of scanning is set to "B" (A<B), which is different from the number of times of scanning in the print operation using the thick ink.

In the fourth embodiment, when a printing medium with a low ink absorbing rate is used, an image can be printed upon decreasing the amount of ink discharge per unit time, and increasing the number of times of scanning. However, the user may designate an arbitrary number of times of scanning through an operation unit 307. In this case, the printer apparatus of the fourth embodiment or a program such as printer driver 103 may have a function of warning against the possibility of the overflow of an ink on a printing medium.

[Fifth Embodiment]

The fifth embodiment includes a means for identifying a head cartridge having an ink tank containing a relatively thick ink (which is mounted when a print operation using a thick ink is to be performed) or a head cartridge having an ink tank containing at least a thin ink of one color (which is mounted when a print operation using a thin ink is to be performed), and the means of identifying the type of printing medium used for a print operation. Assume that a print operation using a thin ink is to be performed by using a printing medium having the highest ink absorbing rate or a large ink absorbing capacity. In this case, mask data is selected such that the amount of ink injected per unit time is maximized within the range in which the ink does not overflow the printing medium, and the driving frequency of the head cartridge 1 is set in accordance with the selected amount.

Since the arrangement of the ink-jet printer apparatus of the fifth embodiment is almost the same as that of the embodiment described above, a description thereof will be omitted.

Figure 32:
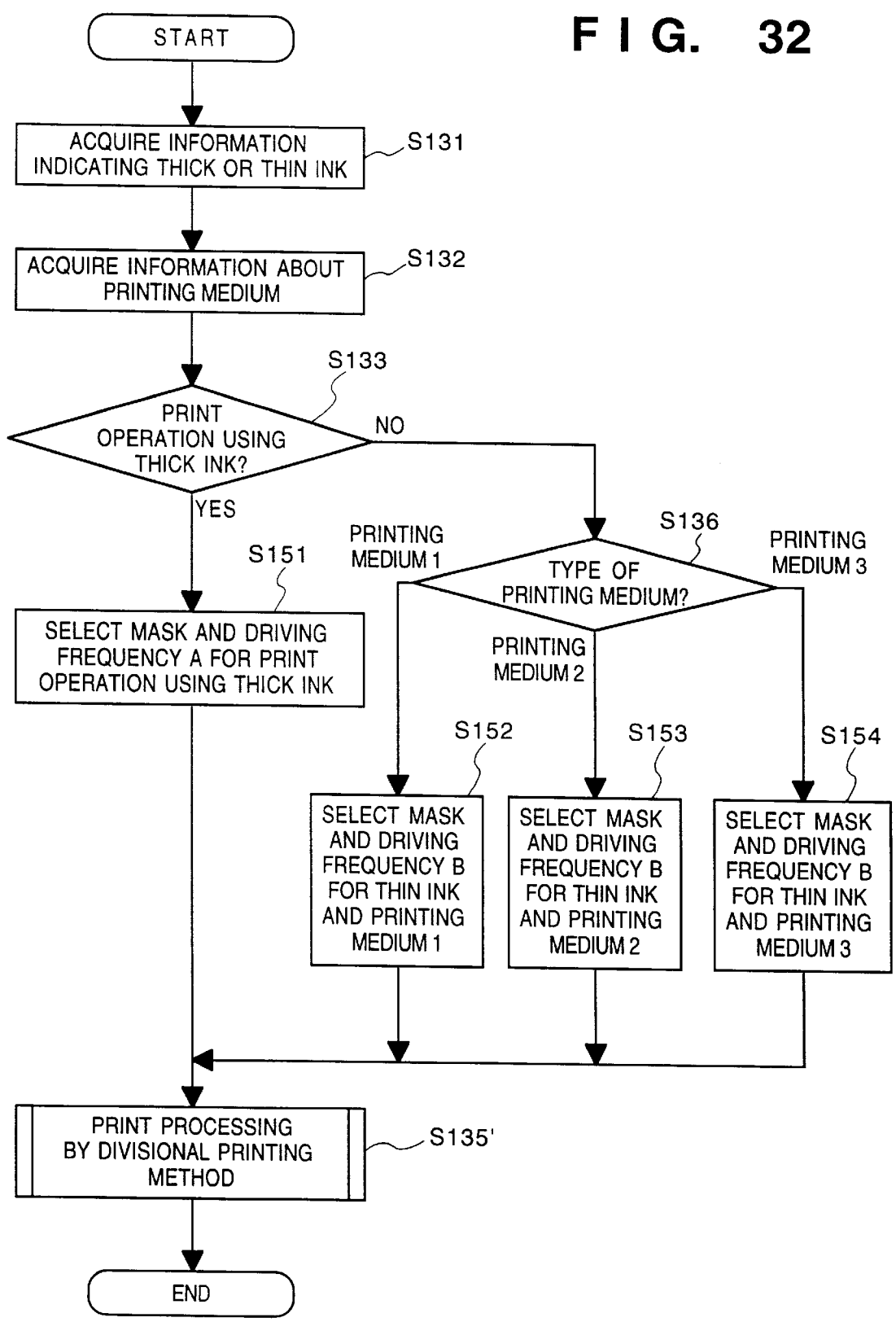
FIG. 32 is a flow chart for explaining print control performed by an ink-jet printer apparatus according to the fifth embodiment of the present invention.

FIG. 32 is a flow chart showing processing performed by the ink-jet printer apparatus of the fifth embodiment. The control program for executing this processing is stored in a program memory 311.

The same reference symbols in FIG. 32 denote the same steps as in FIG. 29, and a description thereof will be omitted.

If it is determined in step S133 that the head cartridge 1 contains a thick ink, the flow advances to step S151 to select thick ink mask data from a mask data storage unit 413, and driving frequency information "A" suited for the thick ink from a frequency memory 414. The flow then advances to step S135' to perform a print operation corresponding to one page by the divisional printing method. The processing in step S135' is the same as that in the flow chart of FIG. 30.

If it is determined in step S133 that the head cartridge 1 contains a thin ink, the flow advances to step S136 to check the type of printing medium mounted on the basis of the printing medium information acquired in step S132. In this step, the type of printing medium (e.g., 1: plain paper, 2: ink-jet print paper, 3: resin film) is determined. The flow then advances to one of steps S152 to S154 in accordance with the determined type to select corresponding mask data and set the driving frequency to "B" (A>B). The flow advances to step S135' to perform a print operation by the divisional printing method. In this case, the driving frequency of the head cartridge 1 in a print operation using a thick ink differs from that in a print operation using a thin ink.

[Sixth Embodiment]

The sixth embodiment includes a means of identifying a head cartridge having an ink tank containing a relatively thick ink (which is mounted when a print operation using a thick ink is to be performed) or a head cartridge having an ink tank containing at least a thin ink of one color (which is mounted when a print operation using a thin ink is to be performed), and the means of identifying the type of printing medium used for a print operation. When a print operation using a thin ink is to be performed, the start of a print/scanning operation is delayed such that after a scanning operation is finished, the next print operation is started after an elapse of a predetermined period of time corresponding to the type of printing medium.

In performing a scanning operation, if an ink injected in the previous scanning operation has not sufficiently permeated through a printing medium and is left near its surface, the ink tends to overflow to cause a deterioration in image quality such as a blur. In the sixth embodiment, therefore, when a print operation using a thin ink is to be performed, and a printing medium having a low ink absorbing rate is used, a scanning operation is performed a predetermined period of time after the previous scanning operation has completed, although such a standby operation is not performed in a print operation using a thick ink.

With this operation, the printer apparatus can perform a scanning operation for a print operation while avoiding a state in which an ink tends to overflow so as to cause a disadvantage in permeation of the ink. The printer apparatus can therefore perform a print operation at the maximum speed in accordance with the printing medium to be used while preventing a deterioration in image quality due to an ink overflow.

In the third to sixth embodiments, when an image is to be printed by using a thin ink, print control may be changed, on the basis of the information from the detection unit 409 described above, in accordance with the environment and conditions (e.g., changes in the amount of ink discharged from the head cartridge 1 with a rise in temperature in the process of the printing operation of the head cartridge 1) in which the printer apparatus is installed. Such a change in print control is also effective in performing a high-speed print operation with high image quality.

The ink absorbing capacity of a printing medium greatly changes depending on the environment. The ink discharging characteristics of the head cartridge 1 also change with changes in temperatures. In general, the volume of an ink droplet discharged from the head cartridge 1 increases with a rise in temperature, while the ink absorbing rate of the printing medium decreases with an increase in humidity. For this reason, the printer apparatus can perform a print operation at the maximum speed without causing any ink overflow in any conditions by changing print control in accordance with the environment and conditions in which the printer apparatus is installed.

In the third to sixth embodiments described above, the printer apparatus is controlled on the basis of both information indicating whether the head cartridge 1 having an ink tank containing a relatively thick ink is mounted (when a print operation using a thick ink is to be performed) or the head cartridge 1 having an ink tank containing at least a thin ink of one color is mounted (when a print operation using a thin ink is to be performed), and information indicating the type of printing medium used for a print operation.

Assume that only one type of printing medium is used for a print operation using a thin ink, or the ink absorbing characteristics of printing media used for a print operation using a thin ink do not greatly vary. In this case, the amount of ink discharged per unit time and the amount of ink discharged per unit area may be controlled on the basis of only information indicating whether the head cartridge 1 having an ink tank containing a relatively thick ink is mounted (when a print operation using a thick ink is to be performed) or the head cartridge 1 having an ink tank containing at least a thin ink of one color is mounted (when a print operation using a thin ink is to be performed). A print operation can therefore be performed with simpler control.

In the above embodiments, the head cartridge 1 with an ink tank includes a means 402 for identifying the type of ink. However, the present invention is not limited to this. Other techniques may be used as long as the printer apparatus main body can discriminate whether the ink in the head cartridge 1 is a thick or thin ink. For example, light from a light source may be irradiated on a transparent ink tank. The type of ink in the head cartridge 1 may be detected on the basis of the intensity of transmitted, reflected, or scattered light. Alternatively, the user may designate the type of ink through a switch or the like of the printer apparatus or software (e.g., a driver used by the OS of the computer) capable of controlling the printer apparatus.

In addition, this embodiment can be effectively applied to a printer apparatus and method which print an image by using a thick ink and print an image by using an ink containing at least a thin ink of one color. Assume that inks having different densities are to be used in combination in accordance with a print color. This print operation can be effectively performed by a method of controlling the amount of ink injected by using different masks for the respective colors in the divisional printing method. In this case, a driving frequency and a standby condition for a print operation are set on the basis of the maximum amount of ink injected, thereby preventing an ink overflow and an accompanying deterioration in image quality.

In the flow chart of FIG. 30 described above, every time a print operation corresponding to one scanning operation is complete, the carriage unit 2 is returned to the print start position. However, the present invention is not limited to this. A print operation may be performed by a reciprocal scanning operation.

The above embodiments use the system, among various ink-jet recording systems, which has a means (e.g., an electrothermal converter or laser light) for generating heat energy as energy used to discharge an ink, and changes the state of an ink by using the heat energy. With this system, a high-density, high-resolution print operation can be realized.

As for the typical structure and principle, it is preferable that the basic structure disclosed in, for example, U.S. Pat. Nos. 4,723,129 or 4,740,796 is employed. The aforesaid method can be adapted to both a so-called on-demand type apparatus and a continuous type apparatus. In particular, a satisfactory effect can be obtained when the on-demand type apparatus is employed because of the structure arranged in such a manner that one or more drive signals, which rapidly raise the temperature of an electrothermal converter disposed to face a sheet or a channel which holds the fluid (ink) to a level higher than levels at which film boiling takes place are applied to the electrothermal converter in accordance with print information so as to generate heat energy in the electrothermal converter and to cause the heat effecting surface of the printhead to take place film boiling so that bubbles can be formed in the fluid (ink) to correspond to the one or more drive signals. The enlargement/contraction of the bubble will cause the fluid (ink) to be discharged through an orifice so that one or more droplets are formed. If a pulse shape drive signal is employed, the bubble can be enlarged/contracted immediately and properly, causing a further preferred effect to be obtained because the fluid (ink) can be discharged while revealing excellent responsibility.

It is preferable that a pulse drive signal disclosed in U.S. Pat. Nos. 4,463,359 or 4,345,262 is employed. If conditions disclosed in U.S. Pat. No. 4,313,124 which is an invention relating to the temperature rising ratio at the heat effecting surface are employed, a satisfactory print result can be obtained.

As an alternative to the structure (linear channel or perpendicular channel) of the printhead disclosed in each of the aforesaid inventions and having an arrangement that discharge ports, channels and electrothermal converters are combined, a structure having an arrangement that the heat effecting surface is disposed in a bent region and disclosed in U.S. Pat. Nos. 4,558,333 or 4,459,600 may be employed. In addition, the following structures may be employed: a structure having an arrangement that a common slit is formed to serve as a discharge section of a plurality of electrothermal converters and disclosed in Japanese Patent Laid-Open No. 59-123670; and a structure disclosed in Japanese Patent Laid-Open No. 59-138461 in which an opening for absorbing pressure waves of heat energy is disposed to correspond to the discharge section.

In addition, the invention is effective for a printhead of the freely exchangeable chip type which enables electrical connection to the printer apparatus main body or supply of ink from the main body by being mounted onto the printer apparatus main body, or for the case by use of a printhead of the cartridge type provided integrally on the printhead itself.

It is preferable that the printer apparatus of each embodiment described above additionally employs a printhead restoring means and an auxiliary means, because the print operation can be further stabilized. More specifically, it is preferable to employ a printhead capping means, a cleaning means, a pressurizing or suction means, an electrothermal converter, another heating element or a pre-heating means constituted by combining them, and a pre-discharging mode of performing a discharging operation independently of a print operation.

Furthermore, the printer apparatus may have a multiple ink-jet printhead structure having at least one of the following modes: a mode of printing a multicolor image of colors having different hues, and a mode of printing a full-color image by mixing colors, as well as a print mode of printing an image of a main color such as black. This printhead structure may be obtained by integrating printheads or combining a plurality of printheads.

In the embodiments, color property (including black) indicate the color developing intensity of an ink itself or the color developing intensity of an ink printed on a printing medium. With regard to an achromatic color, the color property indicates the lightness of the color. In this sense, with regard to inks containing the same dye or pigment, the color property indicates the dye density of each ink. When inks printed on printing media are compared with each other, the color property indicates the optical reflection density of each ink or the maximum saturation of each ink with almost the same hue. An ink having excellent color developing characteristics is regarded as an ink having excellent color property.

Although a fluid ink is employed in the aforesaid embodiment of the present invention, an ink which is solidified at the room temperature or lower as well as softened at the room temperature, an ink in the form of a fluid at the room temperature, or an ink which is formed into a fluid when the print signal is supplied may be employed because the aforesaid ink-jet method is ordinarily arranged in such a manner that the temperature of ink is controlled in a range from 30° C. or higher to 70° C. or lower so as to make the viscosity of the ink to be included in a stable discharge range.

Furthermore, an ink which is solidified when it is caused to stand, and liquified when heat energy is supplied in accordance with a print signal can be adapted to the present invention to positively prevent a temperature rise caused by heat energy by utilizing the temperature rise as energy of state transition from the solid state to the liquid state or to prevent ink evaporation. In any case, an ink which is liquified when heat energy is supplied in accordance with a print signal so as to be discharged in the form of fluid ink, or an ink which is liquified only after heat energy is supplied, e.g., an ink which starts to solidify when it reaches a printing medium, can be adapted to the present invention. In the aforesaid case, the ink may be of a type which is held as fluid or solid material in a recess of a porous sheet or a through hole at a position to face the electrothermal converter as disclosed in Japanese Patent Laid-Open No. 54-56847 or Japanese Patent Laid-Open No. 60-71260. It is the most preferred way for the ink to be adapted to the aforesaid film boiling method.

Moreover, the printer apparatus of the present invention may take various forms. For example, the printer apparatus may be incorporated as an image output terminal in an information processing apparatus such as a computer, or may be separately used as such a terminal. Alternatively, the printer apparatus may be combined with a reader or the like to serve as a copying machine.

The present invention can be applied to a system constituted by a plurality of devices or an apparatus constituted by a single device. As is apparent, the present invention is also applied to a case wherein the same effects as described above are achieved by supplying programs to a system or apparatus. In this case, a storage medium storing the programs according to the present invention becomes a constituent element of the present invention. The system or apparatus operates in a predetermined manner when the programs are loaded from the storage medium into the system or apparatus.

According to the above embodiments, multivalued image data is divided into data corresponding to the respective colors, and binarization or multivalued processing of the data is performed in accordance with the respective colors. The present invention is not limited to this. For example, the printer apparatus main body may have such a function. In addition, the host computer may develop image data into print data and transmit it to the printer apparatus instead of outputting print codes to the printer apparatus.

In the above embodiments, the type of ink in a printhead may be identified by identifying the type of head cartridge integrally constituted by a printhead and a cartridge or the type of ink tank mounted in a printhead.

As described above, according to the embodiments described above, the printer apparatus includes the means for checking whether the printer apparatus is ready for a print operation using a thin ink. With this means, the printer apparatus can eject an ink onto a printing medium in an amount required for each color by changing the amount of ink ejected onto the printing medium on the basis of the information from the means, thereby forming an image with a necessary density.

In addition, by changing the maximum amount of ink ejected onto a printing medium per unit time or the amount of ink ejected onto a printing medium per unit time on the basis of information about the printing medium, images having required densities can be printed at the maximum speed by using many types of printing media while preventing an ink overflow and an accompanying deterioration in image quality.

Furthermore, by changing the maximum amount of ink ejected onto a printing medium per unit time or the amount of ink ejected onto a printing medium per unit time on the basis of at least environmental temperature information, images having required densities can be printed at the maximum speed by using many types of printing media under various environmental conditions while preventing an ink overflow and an accompanying deterioration in image quality.

According to the embodiments, in the printer apparatus, inks having different pigment densities are exchanged to perform a print operation by exchanging head cartridges or ink tanks. In addition, the amount of ink ejected or the maximum amount of ink ejected in print operation is changed in accordance with a combination of the pigment densities of inks in a cartridge with changes in the pigment densities of inks upon exchange of cartridges, thereby determining the maximum amount of coloring material discharged onto a printing medium. With this operation, a print operation can be performed in accordance with the type of printing medium used for the print operation.

In the embodiments, when a print operation is to be performed by using coloring materials having low pigment densities, each color is separated into primary and secondary color components for each pixel, and the maximum amount of coloring material ejected is determined for each nth-order color component in accordance with the type of printing medium used instead of simply increasing the maximum amount of ink having a low pigment density in accordance with a color pigment ratio.

With this function, even if coloring materials having low pigment densities are used, both images of primary and secondary colors can be obtained as print images having almost the same optical reflection densities as those of images printed by using coloring materials having high pigment densities. The present invention is basically characterized in that the amount of each pigment on a printing medium per unit area can be changed by replacing a cartridge or ink tank even if coloring materials having different pigments are used. More specifically, by making the pigment densities almost equal to each other, the maximum densities can be made almost equal to each other while the graininess is reduced.

According to the embodiments, the amount of ink ejected onto a printing medium is decreased to reduce the load on the printing medium, and at the same time the running cost can be suppressed. Since the amount of ink ejected is changed in accordance with the pigment density of an ink to be used, and the amount of ink ejected can be finely controlled for each color, the present invention can be effectively applied to especially a general ink-jet printer apparatus for printing an image on a printing medium whose ink ejection amount limit is low.

The present invention is not limited to the above embodiments and various changes and modifications can be made within the spirit and scope of the present invention. Therefore, to apprise the public of the scope of the present invention, the following claims are made.

What is claimed is:

1. An ink-jet printing apparatus for printing an image on a printing medium by using an ink, comprising:
    a mount portion on which replaceable first type and second type of ink-jet printheads can be mounted, the first type of ink-jet printhead discharging a first ink having relatively high density, and the second type of ink-jet printhead discharging a second ink having a color similar to the first ink and a relatively low density; and
    setting means for setting a driving condition including print data form information for the ink-jet printhead in accordance with the type of ink-jet printhead mounted on said mount portion,
    wherein said setting means sets a different print data form in accordance with whether the first type or second type of ink-jet printhead is mounted on said mount portion.

2. The system according to claim 1, wherein said setting means comprises identification means for identifying the type of the ink-jet printhead mounted on said mount portion.

3. The system according to claim 1, wherein said setting means comprises designation means for designating the type of the ink-jet printhead mounted on said mount position.

4. The system according to claim 1, wherein said setting means changes an amount of ink ejected per unit area of the printing medium in accordance with the type of the ink-jet printhead mounted on said mount portion.

5. The system according to claim 1, wherein said setting means provides the second type of ink-jet printhead for discharging the ink having the relatively low density with a driving condition corrected in accordance with a difference between the densities of the first and second inks.

6. The system according to claim 5, wherein said setting means changes the number of times an ink having a color property inferior to a color property of an ink having substantially the same density is discharged in accordance with a difference in color properties between the first and second inks.

7. The system according to claim 5, wherein said setting means comprises regulation means for regulating an upper limit of an amount of ink ejected per unit area, and wherein the number of times the ink is discharged is regulated in accordance with said regulation means.

8. The system according to claim 1, wherein said first and second types of ink-jet printheads comprise first and second multiple ink-jet printheads having a plurality of discharging portions for discharging inks having different hues, both said ink-jet printheads for discharging inks having substantially the same lightness, and said setting means sets substantially the same drivig conditions for inks having substantially the same lightness regardless of density of the first and second inks.

9. The system according to claim 1, wherein the first type of ink-jet printead comprises a first multiple ink-jet printhead for discharging a plurality of inks having apparently different hues, and the second type of ink-jet printhead contains an ink having substantially the same lightness as that of an ink of the first type of ink-jet printhead, and an ink having a density lower than a density of an ink contained in the first type of ink-jet printhead.

10. The system according to claim 1, wherein said setting means converts input color image data expressing each pixel as M-levels into color image data expressing each pixel as N-levels (N<M), in accordance with the type of the ink-jet printhead mounted on said mount portion.

11. The system according to claim 1, wherein said setting means sets one-bit print data in a case where the first type of the ink-jet printhead is mounted on said mount portion, and sets multi-valued print data in a case where the second type of the ink-jet printhead is mounted on said mount portion.

12. The system according to claim 1, wherein said setting means sets one-bit print data with respect to each color data used in the first type of the ink-jet printhead in a case where the first type of the ink-jet printhead is mounted on said mount portion, and sets one-bit print data with respect to predetermined color data used in the second type of the ink-jet printhead and sets multi-bit print data with respect to color data other than the predetermined color data used in the second type of the ink-jet printhead in a case where the second type of the ink-jet printhead is mounted on said mount portion.

13. An ink-jet printing method of printing an image on a printing medium by using an ink-jet printhead discharging either a first ink of a relatively high density or a second ink of a similar color as the first ink and of a relatively low density, a first type of ink-jet printhead discharging the first ink and a second type of ink-jet printhead discharging the second ink, comprising:
    a data setting step of setting a print data form in accordance with the type of the ink-jet printhead used; and
    a step of printing the image on the printing medium by driving the used ink-jet printhead in accordance with the print data form set in said data setting step,
    wherein in said setting step, a different print data form is set according to whether the first or second ink-jet printhead is used.

14. The method according to claim 13, wherein said data setting step comprises determining whether the print data form for one pixel is one-bit print data or multi-bit print data in accordance with the type of ink-jet printhead used.

15. The method according to claim 13, wherein in said data setting step, input color image data expressing each pixel as M-levels is converted into color image data expressing each pixel as N-levels (N<M), and
    wherein a different N-level is set in accordance with the type of ink-jet printhead used.

16. The method according to claim 13, wherein in said setting step, one-bit print data is set in a case where the first type of the inkjet printhead is used, and multi-valued print data is set in a case where the second type of the ink-jet printhead is used.

17. The method according to claim 13, wherein in said setting step, one-bit print data is set with respect to each color data used in the first type of the ink-jet printhead in a case where the first type of the ink-jet printhead is used, and one-bit print data is set with respect to predetermined color data used in the second type of the ink-jet printhead and multi-bit print data is set with respect to color data other than the predetermined color data used in the second type of the ink-jet printhead in a case where the second type of the ink-jet printhead is used.

18. A printing system comprising an ink-jet printer apparatus for printing an image on a printing medium by using either a first ink of a relatively high density or a second ink of a similar color as the first ink and of a realtively low density, a first type of ink-jet printhead discharging the first ink and a second type of ink-jet printhead discharging the second ink, and a host unit,
    said host unit comprising:
        identification means for identifying the type of the ink-jet printhead used in said ink-jet printer apparatus;
        data changing menas for changing a form of color data representing image data in accordance with the type of ink-jet printhead identified by said identification means; and
        transmission means for transmitting the color data changed by said data changing means to said ink-jet printer apparatus, and
    said ink-jet printer apparatus comprising:
        notification means for notifying the type of used ink-jet printhead to said host unit;
        input means for inputting the color data transmitted by said transmission means; and
        print means for performing a print operation by using a coloring material in accordance with the color data input by said input means.

19. An information processing apparatus for transmitting data to a printer apparatus for printing an image on a printing medium by using either a first ink of a relatively high density or a second ink of a similar color as the first ink and of a relatively low density, a first type of ink-jet printhead discharges the first ink and a second type of ink-jet printhead discharges the second ink, comprising:
    identification means for identifying the type of ink-jet printhead mounted in the printer apparatus;
    data changing means for changing a form of color data representing image data in accordance with the type of ink-jet printhead identified by said identification means; and
    transmission means for transmitting the color data changed by said data changing means for the printer apparatus.

20. A programs for processing print data used in an ink-jet printer apparatus having a mount portion on which either a first type of ink-jet printhead or a second type of ink-jet printhead can be mounted, the first type of ink-jet printhead discharging a first ink having relatively high density and the second type of ink-jet printhead discharging a second ink having a color similar to the first ink and a relatively low density, the program comprising the steps of:
    obtaining information on whether the mount portion mounts the first type or second type of ink-jet printhead; and
    changing a form of the print data in accordance with whether the first type or second type of ink-jet printhead is mounted on the mount portion.

21. The program according to claim 20, wherein one-bit print data is set in a case where the first type of the ink-jet printhead is mounted, and multi-valued print data is set in a case where the second type of the ink-jet printhead is mounted.

22. The program according to claim 20, wherein one-bit print data is set with respect to each color data used in the first type of the ink-jet printhead in a case where the first type of the ink-jet printhead is mounted, and one-bit print data is set with respect to predetermined color data used in the second type of the ink-jet printhead and multi-bit print data is set with respect to color data other than the predetermined color data used in the second type of the ink-jet printhead in a case where the second type of the ink-jet printhead is mounted.

* * * * *

UNITED STATES PATENT AND TRADEMARK OFFICE
CERTIFICATE OF CORRECTION

PATENT NO. : 6,543,872 B2
DATED : April 8, 2003
INVENTOR(S) : Ohtsuka et al.

It is certified that error appears in the above-identified patent and that said Letters Patent is hereby corrected as shown below:

<u>Title page,</u>
Item [62], Related U.S. Application Data, "Division of application No. 08/847,740, filed on Apr. 22, 1997." should read -- Division of application No. 08/847,740, filed on April 22, 1997, now Pat. No. 6,260,938. --

<u>Drawings,</u>
Sheet 9, Figure 9, "INJECTION" should read -- EJECTION --.

<u>Column 1,</u>
Line 6, "allowed." should read -- now Pat. No. 6,260,938. --
Line 57, "apparatuses" should read -- apparatus --.

<u>Column 12,</u>
Line 37, "injection" should read -- ejection --.
Line 44, "injected" should read -- ejected --.

<u>Column 13,</u>
Lines 1, 4 and 15, "INJECTION" should read -- EJECTION --.
Lines 5, 10, 22, 33, 36, 41, 48 and 64, "injection" should read -- ejection --.

<u>Column 14,</u>
Lines 6, 7, 8, 12, 14, 18, 21, 22, 30, 34, 37, 39, 43, 47, 48 and 55, "injection" should read -- ejection --.
Line 28, "injec-" should read -- ejec- --.

<u>Column 15,</u>
Lines 1, 2 and 4, "injecting" should read -- ejecting --.
Lines 39 and 43, "injection" should read -- ejection --.
Line 52, "injected" should read -- ejected --.

<u>Column 20,</u>
Line 50, "can" should be -- can be --.

<u>Column 21,</u>
Lines 65 and 67, "injected" should read -- ejected --.

<u>Column 22,</u>
Lines 3, 18, 19, 26, 34 and 41, "injected" should read -- ejected --.
Line 8, "injection" should read -- ejected, --.
Line 9, "injecting" should read -- ejecting --.

UNITED STATES PATENT AND TRADEMARK OFFICE
CERTIFICATE OF CORRECTION

PATENT NO.     : 6,543,872 B2
DATED          : April 8, 2003
INVENTOR(S)    : Ohtsuka et al.

It is certified that error appears in the above-identified patent and that said Letters Patent is hereby corrected as shown below:

Column 23,
Line 12, "injection" should read -- ejection --.

Column 24,
Line 65, "injected" should read -- ejected --.

Column 26,
Line 43, "injected" should read -- ejected --.

Column 27,
Line 27, "injected" should read -- ejected --.

Column 28,
Line 43, "injected" should read -- ejected --.
Line 47, "injected," should read -- ejected, --.

Column 32,
Line 7, "printing apparatus" should read -- printer system --.

Column 34,
Line 34, "programs" should read -- program --.

Signed and Sealed this

Twenty-fifth Day of May, 2004

JON W. DUDAS
*Acting Director of the United States Patent and Trademark Office*